(12) United States Patent
Kikuchi et al.

(10) Patent No.: US 6,186,003 B1
(45) Date of Patent: Feb. 13, 2001

(54) VIBRATORY GYROSCOPE, VIBRATOR USED IN THIS GYROSCOPE, METHOD FOR ANALYZING VIBRATION OF THE VIBRATOR, METHOD FOR SUPPORTING THE VIBRATOR, AND METHOD FOR MANUFACTURING THE VIBRATORY GYROSCOPE

(75) Inventors: Takayuki Kikuchi, Nagoya; Shosaku Gouji, Ama-Gun; Yukihisa Osugi, Nagoya; Takao Soma, Nishikamo-Gun, all of (JP)

(73) Assignee: NGK Insulators, Ltd. (JP)

( * ) Notice: Under 35 U.S.C. 154(b), the term of this patent shall be extended for 0 days.

(21) Appl. No.: 09/166,089

(22) Filed: Oct. 5, 1998

(30) Foreign Application Priority Data

| Oct. 6, 1997 | (JP) | 9-287624 |
| Nov. 4, 1997 | (JP) | 9-316634 |
| Jan. 30, 1998 | (JP) | 10-032297 |
| Jun. 12, 1998 | (JP) | 10-179777 |

(51) Int. Cl.[7] .................................................. G01P 9/04
(52) U.S. Cl. ............................... 73/504.12; 73/504.16
(58) Field of Search ............................ 73/504.04, 504.12, 73/504.14, 504.15, 504.16, 504.02; 310/370, 311, 316, 317, 329, 321

(56) References Cited

U.S. PATENT DOCUMENTS

| 5,166,571 | * | 11/1992 | Konno et al. | 73/504.16 |
| 5,396,144 | | 3/1995 | Gupta et al. . | |
| 5,451,828 | * | 9/1995 | Tomikawa et al. | 73/504.16 |
| 5,533,397 | * | 7/1996 | Sugitani et al. | 73/504.16 |
| 5,763,781 | * | 6/1998 | Netzer | 73/504.16 |
| 5,824,900 | * | 10/1998 | Konno et al. | 73/504.16 |

FOREIGN PATENT DOCUMENTS

| 7-83671 | 3/1995 | (JP) . |
| 8-128833 | 5/1996 | (JP) . |

* cited by examiner

Primary Examiner—Helen C. Kwok
(74) Attorney, Agent, or Firm—Wall Marjama Bilinski & Burr

(57) ABSTRACT

A vibratory gyroscope for detecting a turning angular rate of rotation applied to a vibrator, which vibratory gyroscope has the vibrator provided with a plurality of vibration pieces and a base part having the plurality of vibration pieces connected with it and is composed so as to obtain the turning angular rate on the basis of a detecting vibration excited in the vibrator according to the turning angular rate when giving a driving vibration to at least one of the vibration pieces, and makes the vibrator being supported in a domain where the detecting vibration is smallest in said vibrator, said domain being in the vicinity of the center of gravity of the vibrator. It is preferable that the vibrator is supported in the vicinity of the center of gravity of a driving vibration of the vibrator and a supporting hole is provided in a domain where the detecting vibration is smallest in a state where no supporting hole is provided in the vibrator and the vibrator is supported on or near the inner wall face of this supporting hole.

16 Claims, 26 Drawing Sheets

(10 of 26 Drawing Sheet(s) Filed in Color)

FIG_1
PRIOR ART
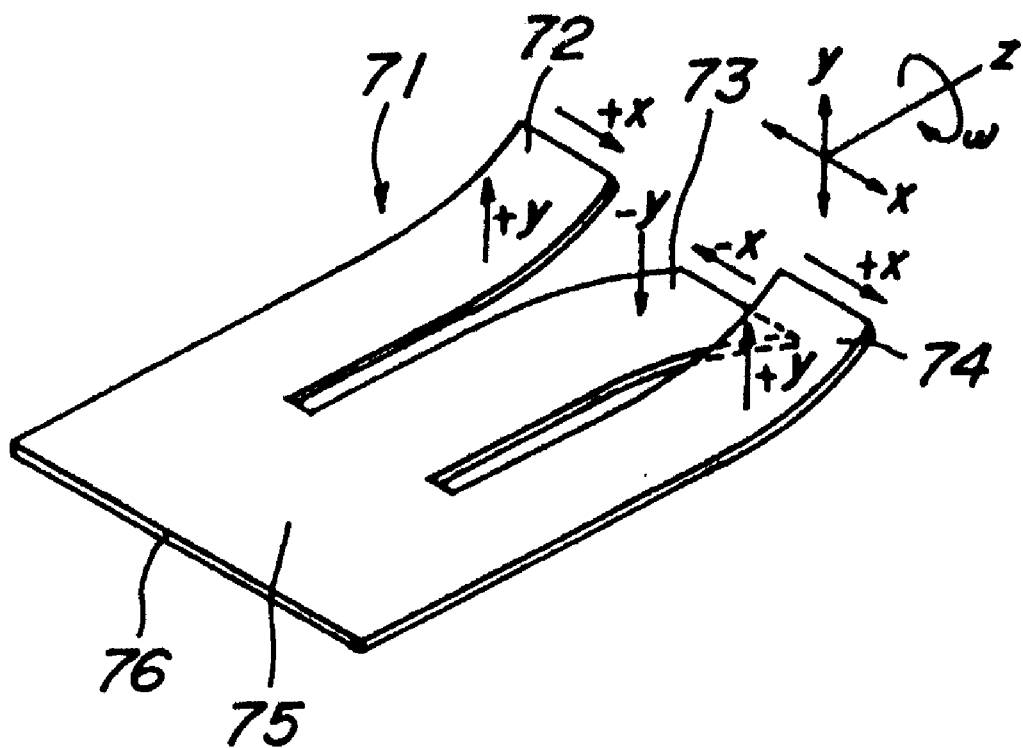

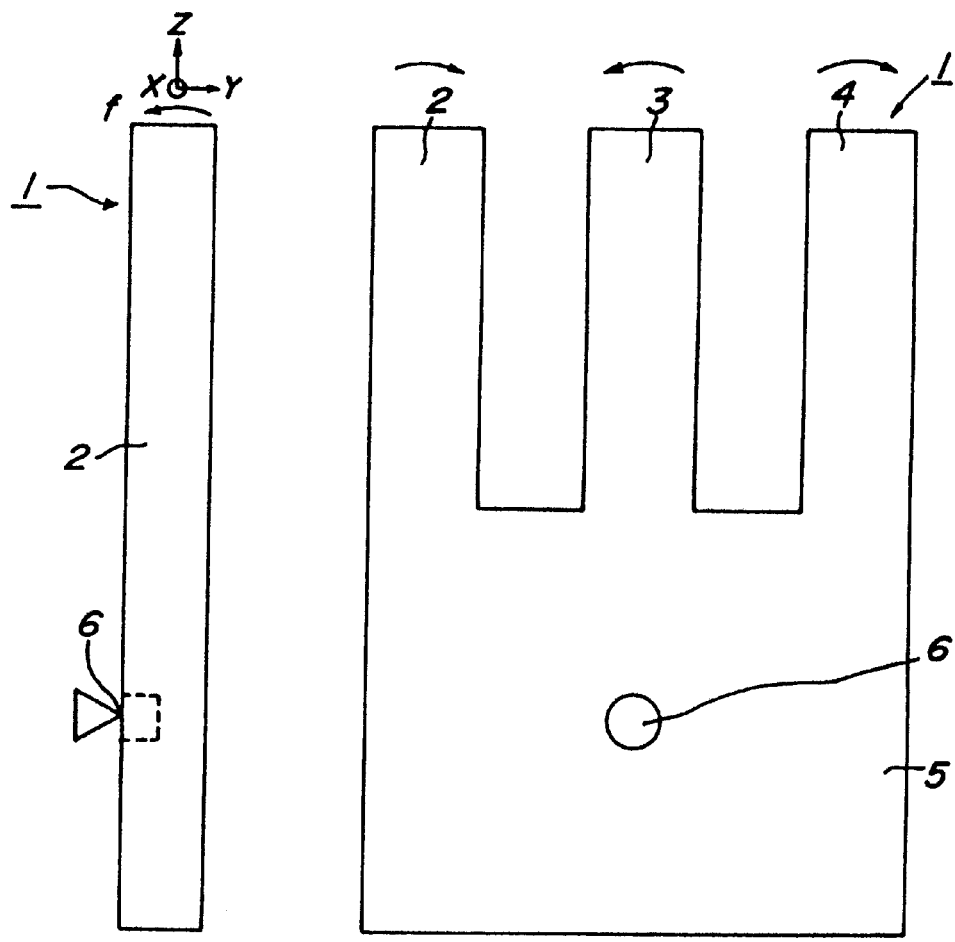
FIG_2a
FIG_2b
FIG_2c

FIG_3a
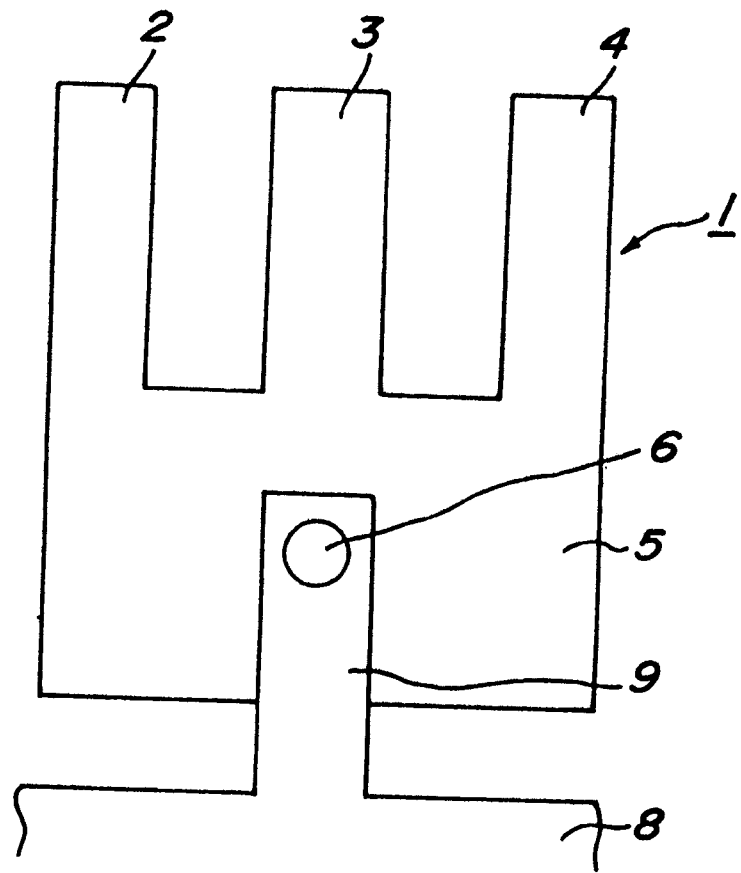
FIG_3b
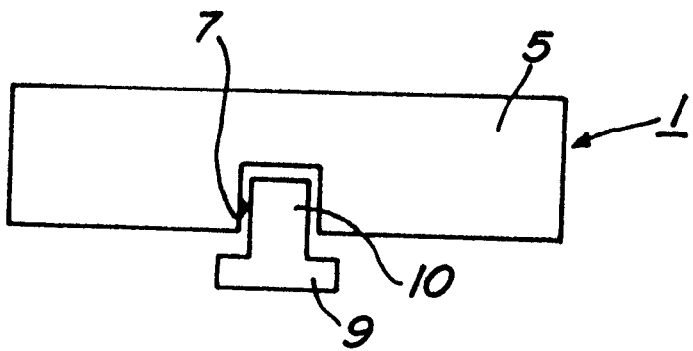

FIG_4
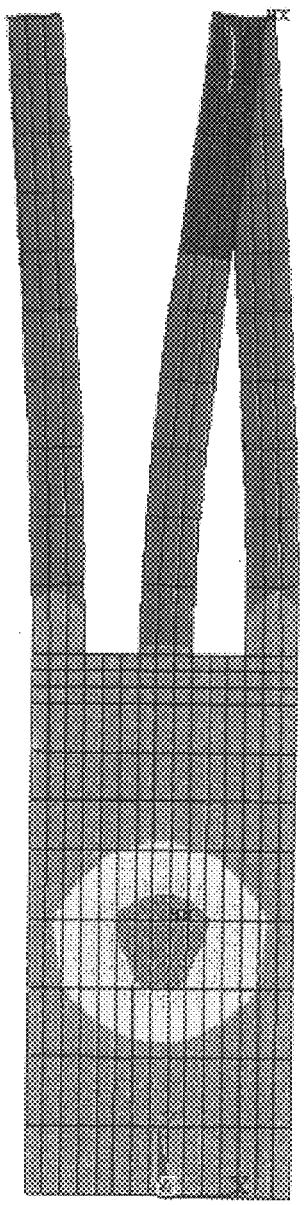
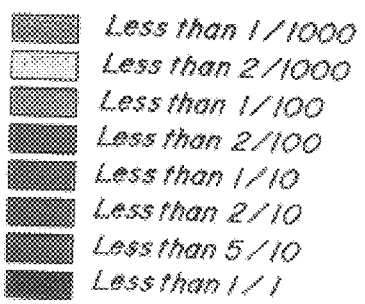
Distribution of vibration amplitudes obtained by a natural mode analysis of a face-parallel vibration
Ratio of amplitude at a domain to amplitude at the maximum vibration amplitude point
- Less than 1/1000
- Less than 2/1000
- Less than 1/100
- Less than 2/100
- Less than 1/10
- Less than 2/10
- Less than 5/10
- Less than 1/1

FIG_5
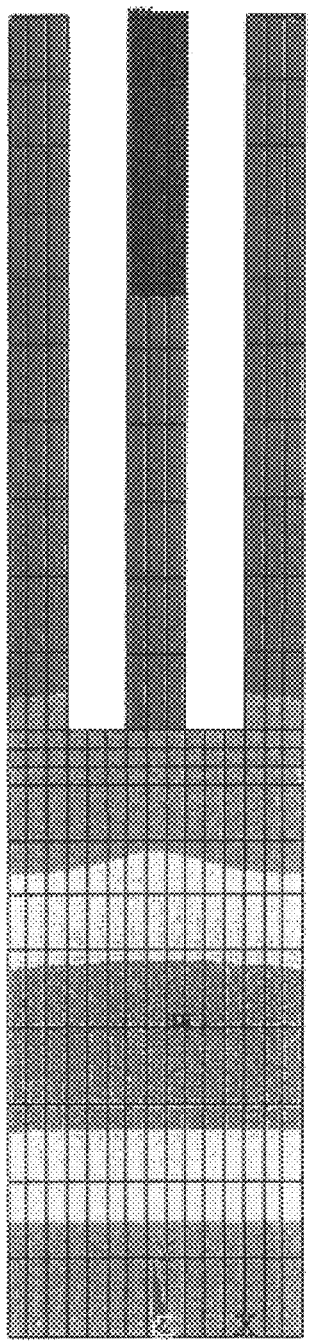
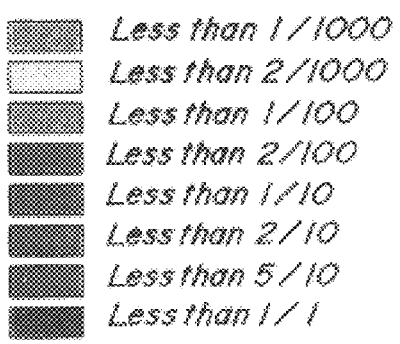
Distribution of vibration amplitudes obtained by a natural mode analysis of a face-normal vibration
Ratio of amplitude at a domain to amplitude at the maximum vibration amplitude point
- Less than 1/1000
- Less than 2/1000
- Less than 1/100
- Less than 2/100
- Less than 1/10
- Less than 2/10
- Less than 5/10
- Less than 1/1

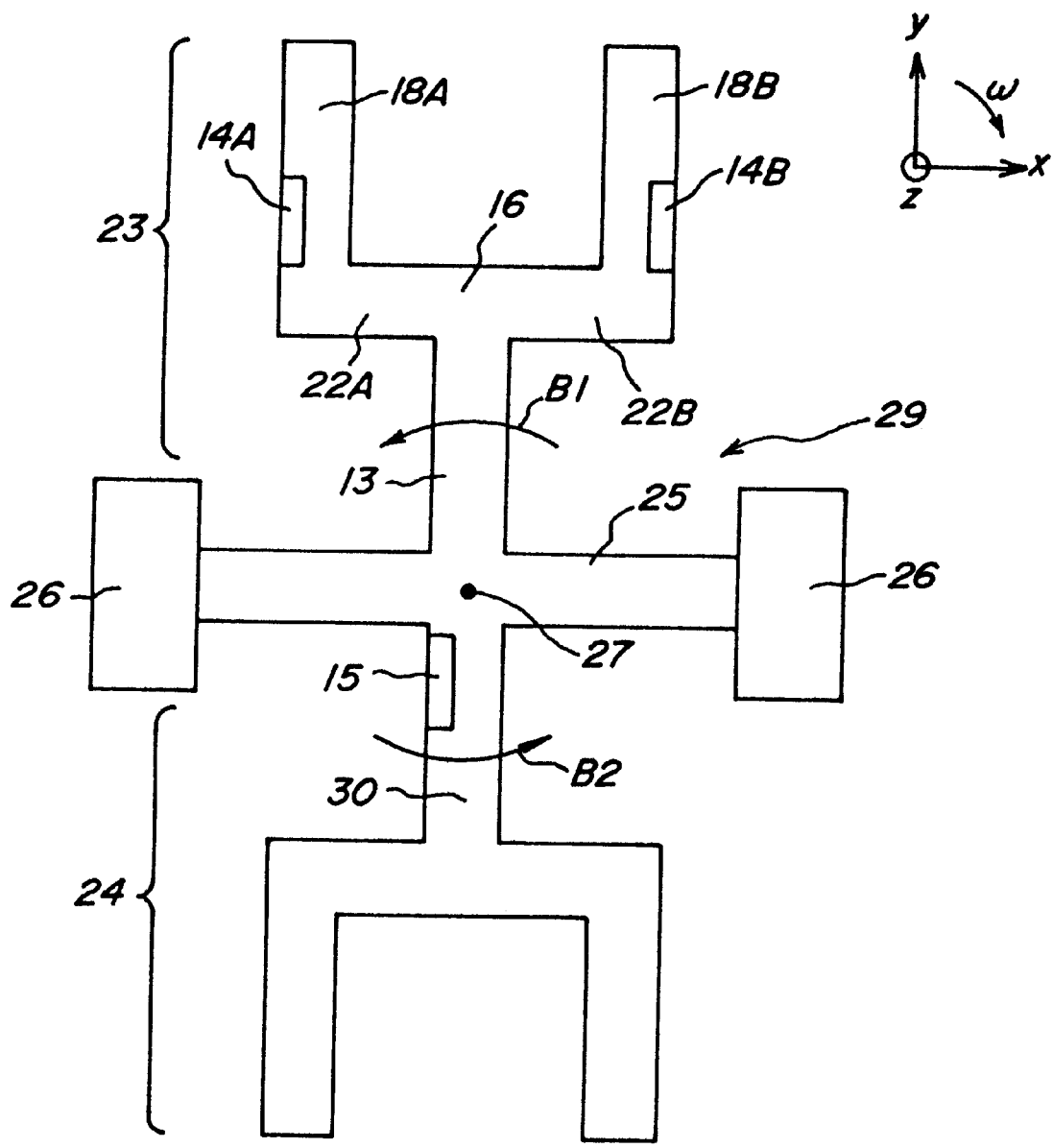
FIG_6

FIG_12

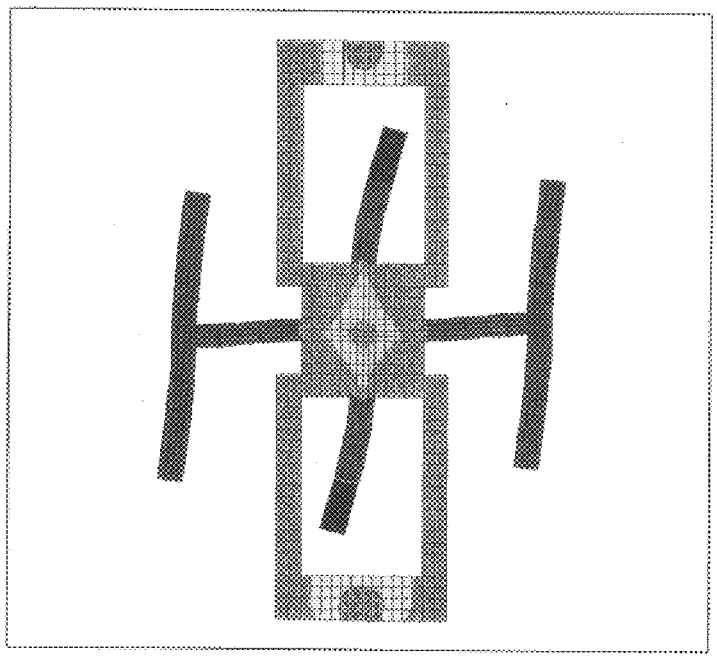
FIG_14

FIG_15a
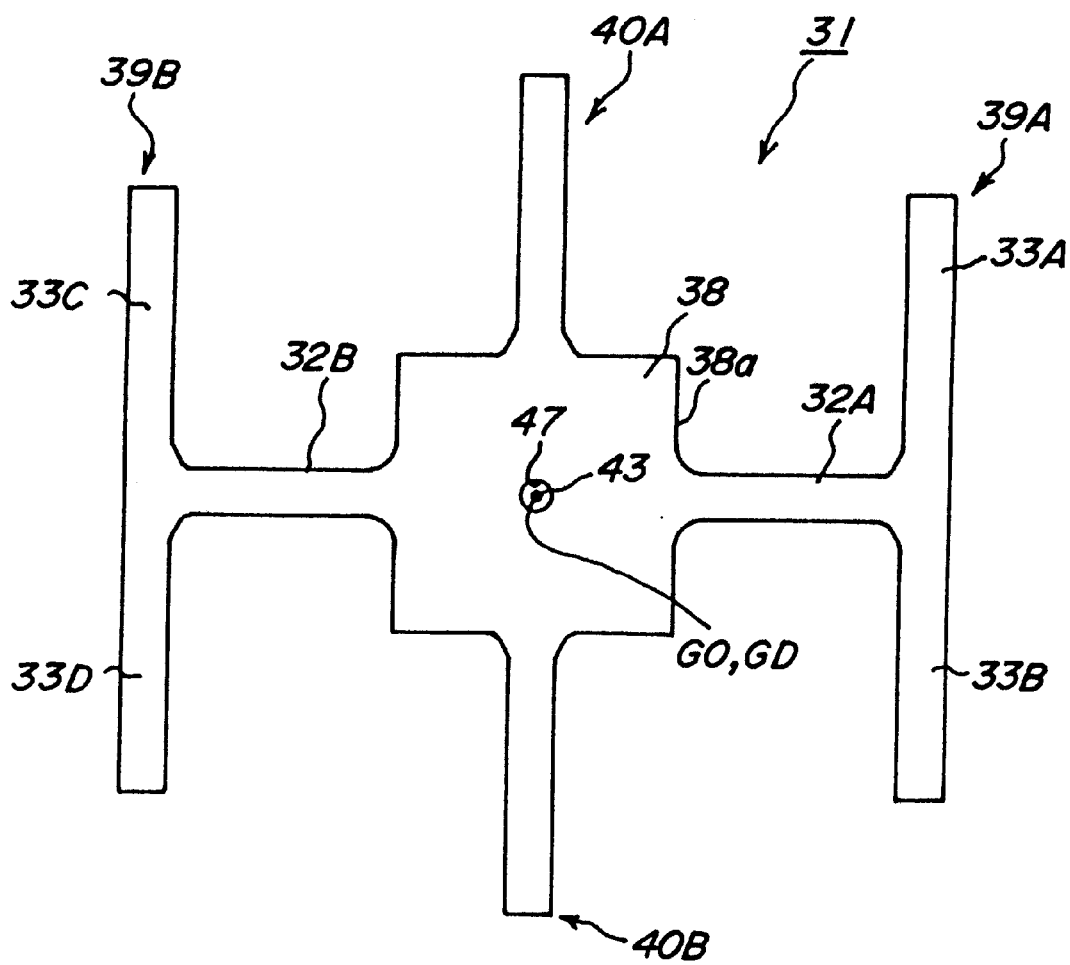
FIG_15b
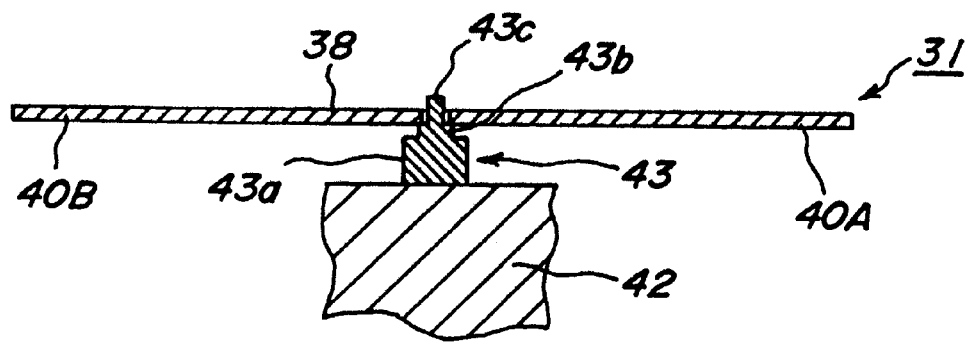

FIG_17
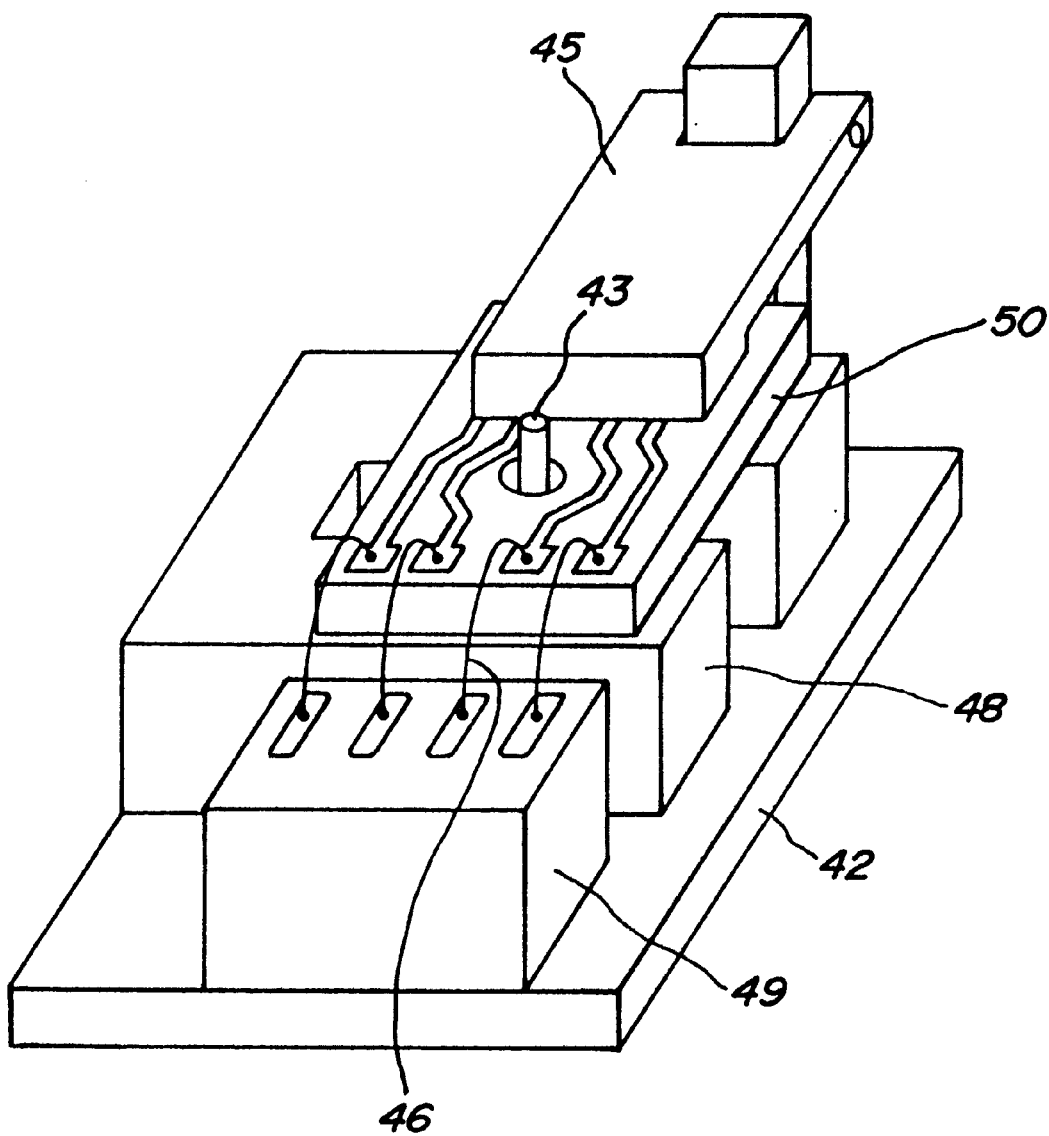

FIG_18a
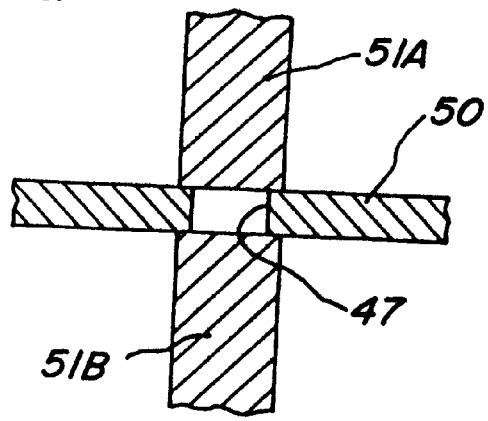
FIG_18b
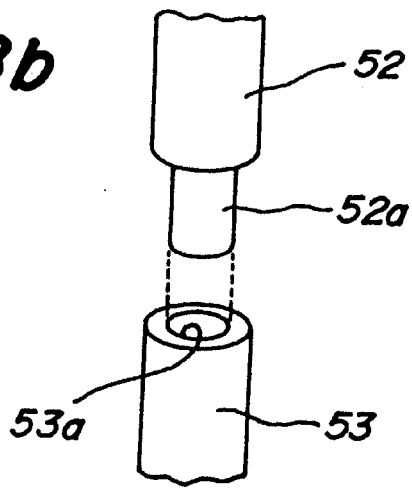
FIG_18c
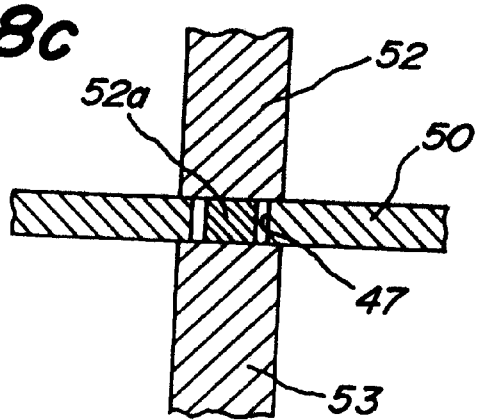

FIG_19a
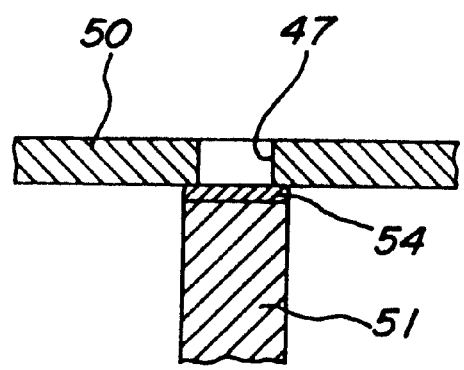
FIG_19b
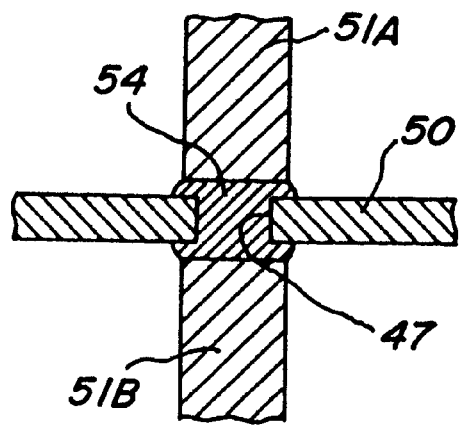
FIG_19c
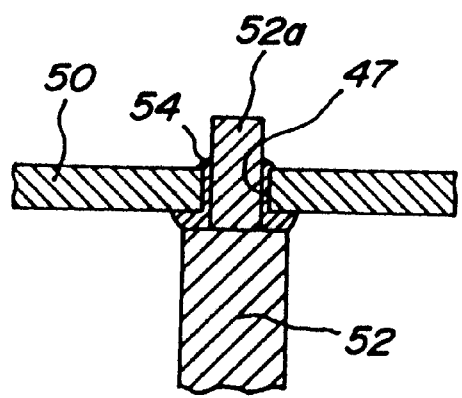
FIG_19d
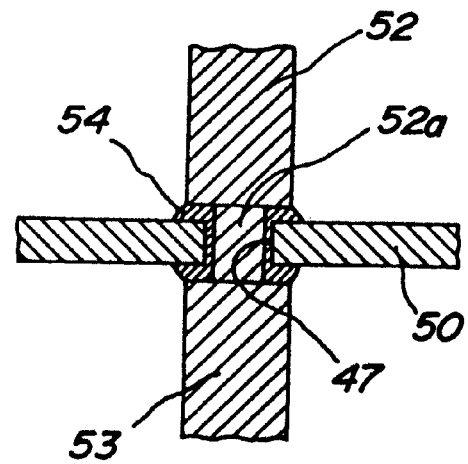

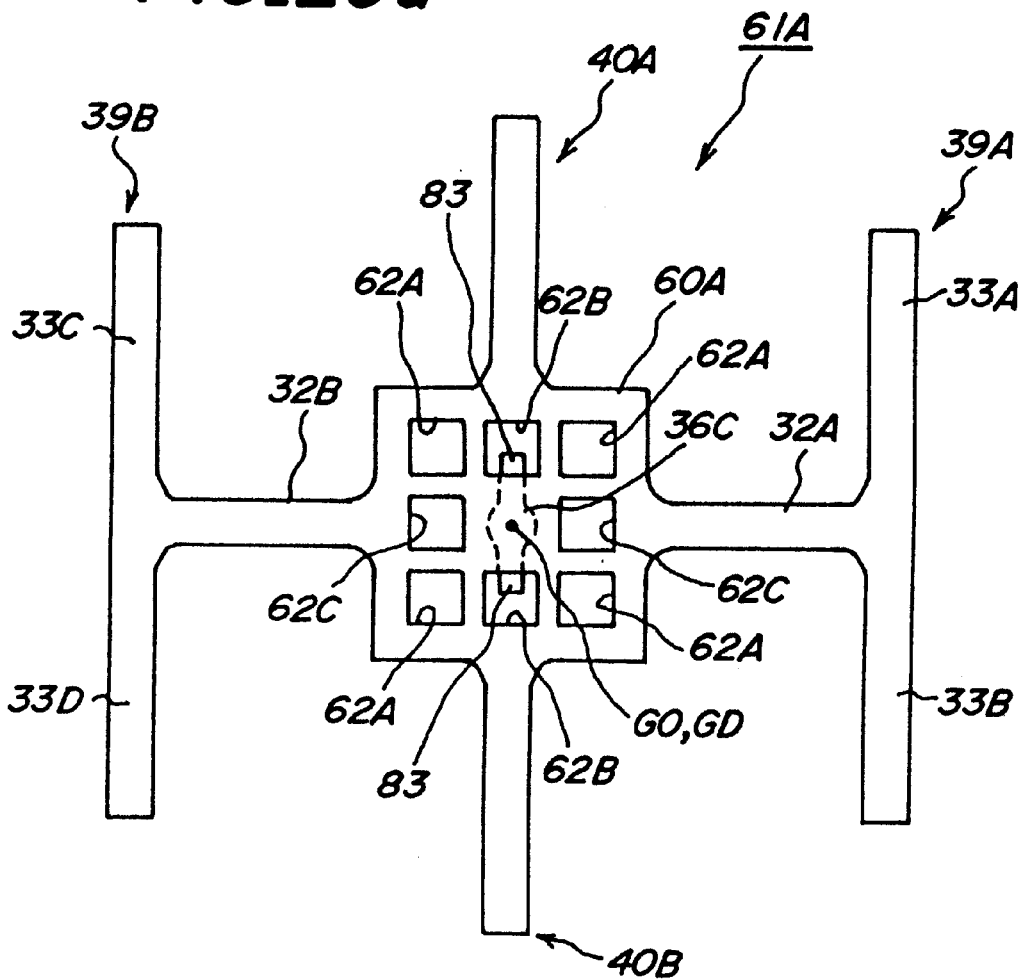
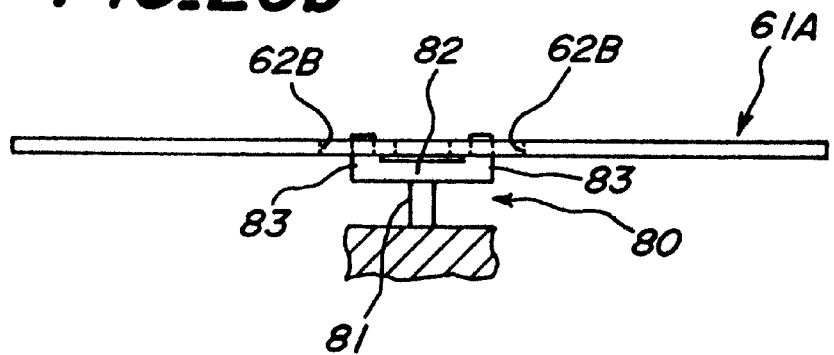

FIG_21
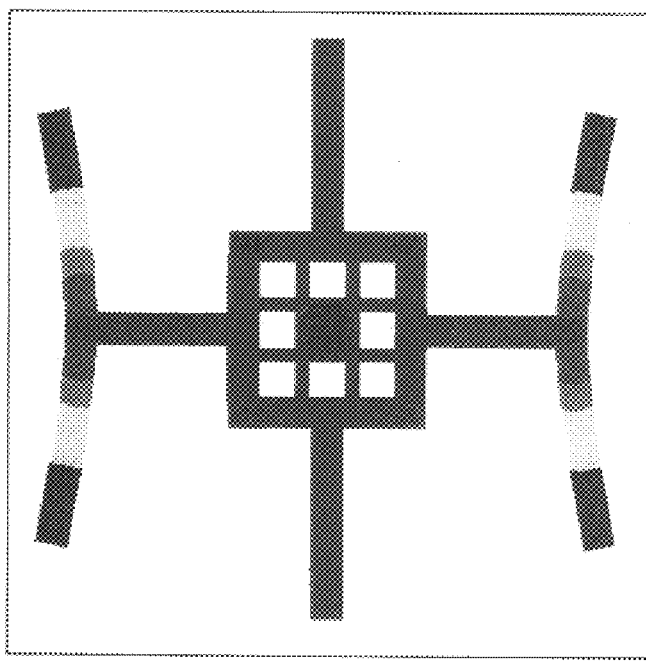
Driving mode
Ratio of amplitude at a domain to amplitude at the maximum vibration amplitude point
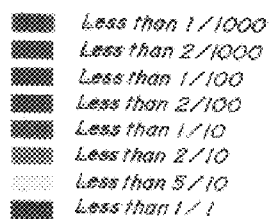
Less than 1/1000
Less than 2/1000
Less than 1/100
Less than 2/100
Less than 1/10
Less than 2/10
Less than 5/10
Less than 1/1

Detection mode
Ratio of amplitude at a domain to
amplitude at the maximum vibration
amplitude point ▬ Less than 1/1000
▬ Less than 2/1000
▬ Less than 1/100
▬ Less than 2/100
▬ Less than 1/10
▬ Less than 2/10
▢ Less than 5/10
▬ Less than 1/1

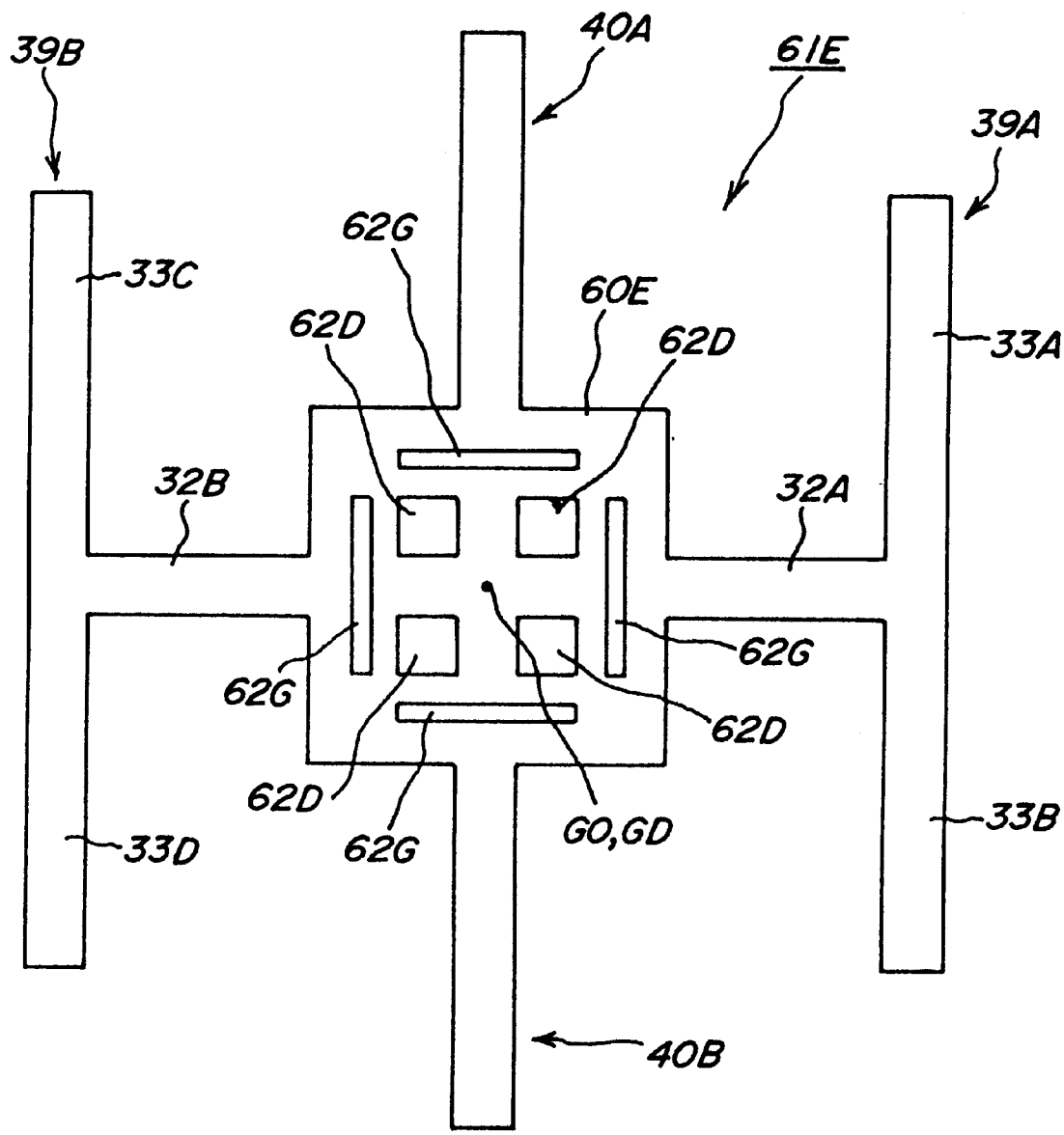

VIBRATORY GYROSCOPE, VIBRATOR USED IN THIS GYROSCOPE, METHOD FOR ANALYZING VIBRATION OF THE VIBRATOR, METHOD FOR SUPPORTING THE VIBRATOR, AND METHOD FOR MANUFACTURING THE VIBRATORY GYROSCOPE

BACKGROUND OF THE INVENTION

1. Technical Field

The present invention relates to a vibratory gyroscope and a vibrator capable of being preferably used in this vibratory gyroscope.

2. Related Arts

Japanese laid-open publication Tokkaihei No. 7-83671 has disclosed a vibratory gyroscope using a tuning-fork vibrator made by joining a total of three vibration pieces composed of a middle driving vibration piece and two detecting vibration pieces, being at both sides of the middle driving vibration piece all joined to a base part in one body. FIG. 1 shows the composition of an example of such a vibratory gyroscope. In the example shown in FIG. 1, a tuning-fork vibrator 71 forming a vibratory gyroscope is composed of three vibration pieces which are composed of a middle driving vibration piece 73 and two detecting vibration pieces 72 and 74 arranged at both sides of it nearly in parallel with it, and a base part 75 with which the driving vibration piece 73 and the detecting vibration pieces 72 and 74 are joined in one body.

In the above-mentioned tuning-fork vibrator 71, the driving vibration piece 73 is vibrated in the X-Z plane by an unillustrated driving means provided on the driving vibration piece 73. And the left and right detecting vibration pieces 72 and 74 are resonated in the same X-Z plane. When a turning angular rate (ω) acts around the axis of symmetry Z of the tuning-fork vibrator 71, a Coriolis force (f) acts on each of the detecting vibration pieces 72 and 74. Since the detecting vibration pieces 72 and 74 are vibrating in the X-Z plane, vibration in the Y-Z plane is induced in the detecting vibration pieces 72 and 74. A turning angular rate is measured by detecting this vibration by means of an unillustrated detecting means provided on each of the detecting vibration pieces 72 and 74.

In a former vibratory gyroscope of the above-mentioned composition, in case of forming the vibratory gyroscope by supporting the tuning-fork vibrator 71, the vibrator 71 is supported by fixing the entire end part 76 of the base part 75 of the tuning-fork vibrator 71 opposite to the other end part at which the driving vibration piece 73 and the detecting vibration pieces 72 and 74 exist, or by fixing an unillustrated supporting vibration piece at a position of this end part 76 corresponding to the axis of symmetry Z. Therefore, it cannot be said that a Coriolis force generated by a turning angular rate is efficiently utilized for action of a detecting vibration in the detecting vibration pieces 72 and 74, and there is a problem that the sharpness of resonance (Q value) of the detecting vibration in the Y-Z plane in the detecting vibration pieces 72 and 74 is low and the measurement sensitivity for a turning angular rate is low.

SUMMARY OF THE INVENTION

An object of the present invention is to provide a vibratory gyroscope which can improve the sharpness of resonance (Q value) of a detecting vibration in a detecting vibration piece and can measure a turning angular rate with high sensitivity.

Another object of the invention is to provide an analyzing method for manufacturing a vibrator having a high sharpness of resonance of a detecting vibration in a detecting vibration piece, and a supporting method and a manufacturing method using this analyzing method.

A vibratory gyroscope of the present invention is a vibratory gyroscope for detecting a turning angular rate of rotation applied to a vibrator, which vibratory gyroscope a vibrator provided with a plurality of vibration pieces and a base part having the plurality of vibration pieces connected with it and is composed so as to obtain the turning angular rate on the basis of a detecting vibration excited in the vibrator according to the turning angular rate when giving a driving vibration to at least one of the vibration pieces, and supports the vibrator in a domain where the detecting vibration is smallest in the vibrator, said domain being in the vicinity of the center of gravity of the vibrator.

Preferably the vibrator is provided with a supporting hole in a domain where the detecting vibration is smallest in a state where the supporting hole is not provided in the vibrator and the vibrator is supported with or in the vicinity, preferably on or near the inner wall face of this supporting hole.

Supporting the vibrator in the vicinity of the supporting hole means supporting the surface of the vibrator within a range of 1 mm from the periphery of the supporting hole.

Another embodiment of the present invention is a vibratory gyroscope for detecting a turning angular rate of rotation applied to a vibrator and the vibrator is provided with a plurality of vibration pieces and a base part having the plurality of vibrating pieces connected with it and the base part is provided with a supporting hole. The gyroscope is composed so as to obtain the turning angular rate on the basis of a detecting vibration excited in the vibrator according to the turning angular rate when giving a driving vibration to at least one of the vibration pieces. The gyroscope is provided with a supporting means for supporting the vibrator with or in the vicinity of the supporting hole.

And the present invention is a vibrator formed out of a piezoelectric single crystal and comprises a plurality of vibration pieces each of which performs a bending-vibration and a base part having the plurality of vibration pieces connected with it and said base part is provided with a supporting hole for supporting said vibrator.

Another embodiment vibratory gyroscope of the present invention is a for detecting a turning angular rate of rotation applied to a vibrator, wherein the vibrator is provided with a plurality of vibration pieces and a base part having the plurality of vibration pieces connected with it and is composed so as to obtain the turning angular rate on the basis of a detecting vibration excited in the vibrator according to the turning angular rate when giving a driving vibration to at least one of the vibration pieces, and the vibrator is supported in a domain where the detecting vibration is smallest in the vibrator, said domain being in the vicinity of the center of gravity of the vibrator (when it is not vibrated). As a result it is possible to improve the sharpness of resonance (Q value) of a detecting vibration in a detecting vibration piece, raise the sensitivity, and reduce the influence which the strain of a vibrator, caused by vibration or acceleration given from the outside of the vibrator, exerts on its vibrating state.

And as a preferred embodiment, to support a vibrator at a domain where a domain where a detecting vibration is smallest and a domain where a driving vibration is smallest overlap each other can raise the Q value of the driving vibration as well as the detecting vibration and further improve the sensitivity.

In a particularly preferred embodiment, a driving vibration and the detecting vibration occur in the plane of a vibrator.

Since the amplitude of a driving vibration is considerably larger than the amplitude of a detecting vibration, it is important to reduce the influence of the driving vibration on the detecting vibration. In a preferred embodiment, a vibrator is supported at or in the vicinity of the center of gravity of the vibrator. Thanks to this, it is possible to minimize the influence of the driving vibration on the detecting vibration.

That a vibrator is supported at or in the vicinity of the center of gravity GO of the vibrator or the center of gravity GD of the driving vibration means that a vibrator supporting point may be located substantially at the center of gravity GO or GD and is within a circle of 1 mm in diameter, said circle having the center of gravity GO or GD as its center.

In a preferred embodiment, a supporting means is joined onto the surface of a vibrator in a domain where the detecting vibration is is smallest by adhesion, gluing, soldering, metalizing or the like, or by pressure-joining.

And it is preferable to provide a supporting hole in a vibrator and support the vibrator on the inner wall face of this supporting hole. In this case, it is possible to provide a projection on a supporting means, insert this projection into the supporting hole, put an adhesive agent, a gluing agent, solder or a metalizing paste between the inner wall face of the supporting hole and the projection, and thereby join the vibrator and the projection with each other.

Depending on the shape and size of a vibrator, a domain where a detecting vibration is smallest in the vibrator sometimes does not appear on the surface of the vibrator or appears with a very small area. Accordingly, by providing a supporting hole in a vibrator and supporting the vibrator with this supporting hole, when exposing said domain to the inner wall face of the supporting hole, it is easy to more surely hold the domain where a detecting vibration is smallest.

A supporting hole may be what is called a blind hole but it is most preferably a through hole, and in case that it is a blind hole the blind hole has preferably a depth of ½ or more in comparison with thickness of the vibrator. The reason is that a domain where a detecting vibration is smallest is wider inside the vibrator than on the surface of the vibrator.

In case of providing a supporting hole in a vibrator and supporting the vibrator with or in the vicinity of this supporting hole, in a preferred embodiment, at least part of the supporting hole exists within a domain where a detecting vibration is smallest in the vibrator in a state where said supporting hole is not provided in the vibrator. The reason that this is preferable is described. It has been found that in case that a domain where a detecting vibration is smallest is exposed onto the surface of the vibrator, when this domain is supported, the following problem occurs. That is to say, when a certain time elapses or the ambient temperature changes after a vibratory gyroscope has been assembled, the measurement of a turning angular rate sometimes was not stable.

The inventors have examined the reason and reached the following discovery. That is to say, for example, in a vibrator as described later, when assembling a vibratory gyroscope and then exciting a specified driving vibration in a vibrator and measuring distribution of the amplitude of vibration in each point of the vibrator, the vibration amplitude changes greatly around a node of the vibration. Due to this, it is difficult to coincide a node of the driving vibration and a node of the detecting vibration with each other. Furthermore, even if a domain where the detecting vibration is smallest is accurately supported at a point of time when a specific supporting means, for example, a projection for supporting has been joined with the domain where the detecting vibration is smallest on the surface of the vibrator, the domain where the detecting vibration is smallest may be sometimes moved slightly from its original position due to a change with the passage of time such as a temperature change and the like. Thus, the degree of disturbance caused by contact of a supporting means with the vibrator, said disturbance acting on a vibrating state of the vibrator, changes and the characteristics of the gyroscope changes.

On the other hand, it has been found that the magnitude of a detecting vibration is averaged in a fairly wide range including a supporting hole and its peripheral area by providing the supporting hole in a domain where the detecting vibration is smallest in a state where no supporting hole is provided in the vibrator and supporting the vibrator with this supporting hole. Thus, even if a certain time passes or an ambient temperature changes after the vibrator has been first supported with or in the vicinity of the supporting hole, the degree of disturbance exerted by the supporting means upon the detecting vibration has come to be hard to change and movement of the zero point caused by a temperature change has become small and the characteristics of the gyroscope has been greatly stabilized.

Additionally, a higher effect can be obtained by filling the supporting hole with such an adhesive as resin and holding the vibrator through the resin by means of the supporting means.

And in a preferred embodiment, a plurality of supporting holes are provided in a base part and a vibrator is supported by the plurality of supporting holes. By this, when an external vibration is applied to the vibrator, the influence of disturbance caused by this external vibration can be remarkably reduced.

In this embodiment, it is preferable to support the vibrator with or in the vicinity of a plurality of supporting holes which are at positions being centrosymmetric with respect to the center of gravity of the vibrator. Thanks to this, the influence of disturbance caused by an external vibration is reduced further.

And it is possible to provide a plurality of supporting holes so as to surround a domain where a detecting vibration is smallest in a vibrator. In this case, it is particularly preferable to support the vibrator with a plurality of supporting holes which are at position being centrosymmetric with respect to the center of gravity of the vibrator.

And in a preferable vibrator, a plurality of vibration pieces comprise driving vibration pieces and detecting vibration pieces, and a supporting hole is provided between one of the detecting vibration pieces and a domain where a detecting vibration is smallest.

And in said vibrator, it is particularly preferable that the domain where the detecting vibration is smallest in the vibrator extends to the inner wall face of the supporting hole. In this case, preferably, the supporting hole is provided around the domain where the detecting vibration is smallest, and more preferably, it is provided between the domain where the detecting vibration is smallest and a detecting vibration piece.

In a vibratory gyroscope of the present invention, as a material for a vibrator, it is preferable to use piezoceramic or a piezoelectric single crystal such as a single crystal of quartz, a single crystal of $LiTaO_3$, $LiNbO_3$ or the like, and particularly it is more preferable to use a piezoelectric single crystal such as a single crystal of quartz, LiTaO$_3$, or LiNbO$_3$. The reason is that a high Q value of a single crystal itself can be effectively utilized.

A domain where a detecting vibration or a driving vibration is smallest in the present invention indicates one or plural domains where a domain where the detecting vibration or driving vibration is smaller than that cannot be found. The vibration amplitude in a detecting vibration or driving vibration is preferably 2/1000 or less of the maximum vibration amplitude point in a vibrator and particularly preferably 1/1000 or less. Preferably, a domain where a detecting vibration is smallest and a domain where a driving vibration is smallest exist locally in part of the base part.

And the present invention computes the ratio of the amplitude of a detecting vibration in a vibrator to the maximum amplitude of the detecting vibration in the vibrator by means of a natural mode analysis by a finite element method and detects a domain where the detecting vibration is smallest from distribution of said ratios in each point of the vibrator. Particularly preferably, it computes the ratio of the amplitude of a driving vibration in each point to the maximum amplitude of the driving vibration in the vibrator by means of a natural mode analysis by a finite element method and detects a domain where the driving vibration is smallest from distribution of said ratios in the vibrator.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

FIG. 1 is a figure showing an example of a tuning-fork vibrator used in a conventional vibratory gyroscope.

FIGS. 2(a), 2(b) and 2(c) are figures showing an example of a vibrator of a vibratory gyroscope of the present invention.

FIGS. 3(a) and 3(b) are figures for explaining an example of a method for supporting a vibrator in the invention.

FIG. 4 is a figure showing an example of a result of applying a natural mode analysis by a finite element method to a tuning-fork vibrator 1.

FIG. 5 is a figure showing another example of a result of applying a natural mode analysis by a finite element method to a tuning-fork vibrator 1.

FIG. 6 is a rough front view for explaining operation of a vibrator 29 having opposite Y-shaped arms.

FIG. 14 is a figure showing an example of a result of applying a natural mode analysis by a finite element method to a detecting vibration mode of the vibrator of FIG. 12.

FIG. 15(a) is a front view showing a vibrator 31 supported by inserting a supporting projection into a supporting hole 47 at the middle of a base part 38 of the vibrator 31, and FIG. 15(b) is a sectional view of it.

FIG. 17 is a perspective view showing the supporting and fixing device of FIG. 16.

FIGS. 18(a), 18(b) and 18(c) are sectional views of a main part showing a state of pressure-joining and supporting a vibrator by means of a pair of supporting projections.

FIGS. 19(a), 19(b), 19(c) and 19(d) are sectional views of a main part showing a state of joining a vibrator with a supporting means and supporting it, using a joining material 54.

FIG. 20(a) is a front view showing a vibrator 61A having eight holes provided in its base part 60A, and FIG. 20(b) is a sectional view of it.

FIG. 21 is a figure showing an example of a result of applying a natural mode analysis by a finite element method to a driving vibration mode of the vibrator of FIG. 20.

FIG. 26 is a front view showing a vibrator 61E having four holes 62D and four holes 62G provided in its base part 60E.

DETAILED DESCRIPTION OF THE INVENTION

Figure 7:
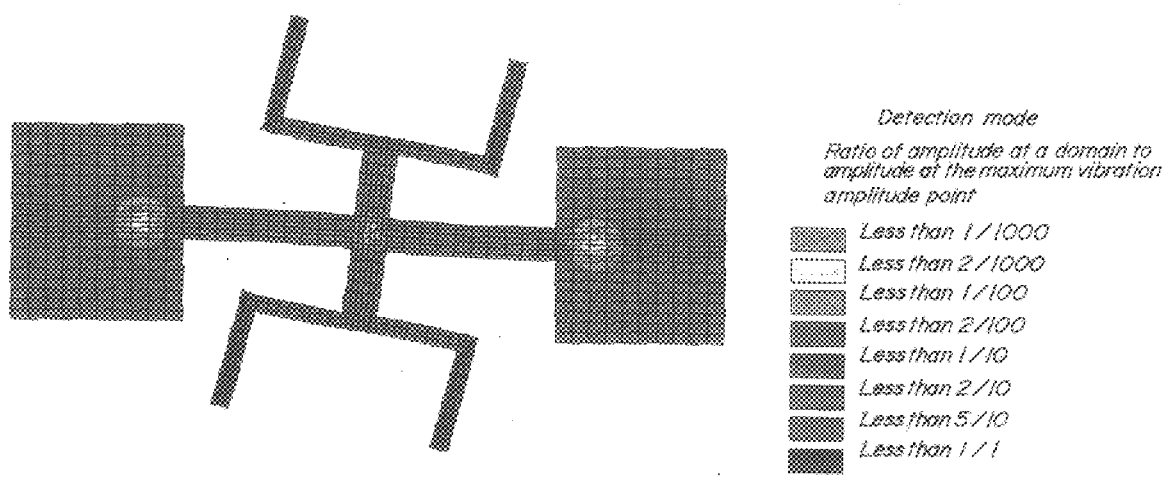
FIG. 7 is a figure showing an example of a result of applying a natural mode analysis by a finite element method to a detecting vibration mode of a vibrator of FIG. 6.

The present invention is further described in detail with reference to the drawings in the following. FIG. 2 shows an example of a vibrator of a vibratory gyroscope; 2(a) is a side view, 2(b) is a front view, and 2(c) is a plan view. This example shows a vibratory gyroscope of a vertical-arrangement type in which a driving vibration and a detecting vibration are vertical with each other. In an example shown in FIGS. 2(a) to 2(c), a tuning-fork vibrator 1 forming the vibratory gyroscope is composed of three vibration pieces 2 to 4 arranged nearly in parallel with one another, and a base part S joining these three vibration pieces. Among the three vibration pieces, the vibration pieces 2 and 4 at both sides form detecting vibration pieces, and the middle vibration piece 3 forms a driving vibration piece.

The driving vibration piece 3 is vibrated in the X-Z plane by means of an unillustrated driving means provided on the driving vibration piece 3. And the left and right detecting vibration pieces 2 and 4 are resonated in the same X-Z plane. When the vibrator is turned around the axis of symmetry Z of the tuning-fork vibrator 1 at a turning angular rate w, a Coriolis force (f) acts on each of the detecting vibration pieces 2 and 4. Since the detecting vibration pieces 2 and 4 are vibrating in the X-Z plane, vibration in the Y-Z plane is excited in the detecting vibration pieces 2 and 4. A turning angular rate is measured by detecting this vibration by means of an unillustrated detecting means provided on each of the detecting vibration pieces 2 and 4.

This embodiment detects a small domain where a detecting vibration is smallest exists locally, by means of an analyzing method described later, provides a supporting hole in this domain, and supports the vibrator with this supporting hole.

A concrete supporting method for supporting a supporting hole is not limited in particular. As an example for it, as shown in FIGS. 3(a) and 3(b), a specified hole 7 is provided at a nearly middle domain 6 of a base part 5 in the direction of thickness of the base part 5, and the vibrator can be fixed by inserting a projection 10 into the supporting hole 7. The projection projects from a vibration piece 9 perpendicularly to the longitudinal direction of the vibration piece 9, projecting from a supporting means 8 of the vibratory gyroscope.

Fixing the projection 10 and the supporting hole 7 onto each other can be performed by applying metallization to the surface of the projection 10 and/or the inner wall face of the supporting hole 7 and then soldering or brazing, or by providing resin between the projection 10 and the hole 7. Although the base part 5 is supported on one surface of it in the example shown in FIGS. 3(a) and 3(b), the base part 5 can be also supported on both surfaces of it. And it is also possible to make the supporting hole 7 into a through hole instead of a blind hole, insert the projection 10 into and through the through hole, and fix both end parts of the projection 10 onto the supporting means 8 of the vibratory gyroscope.

In the above-mentioned example, it has been analyzed by an analyzing method of the present invention that a small domain where a detecting vibration is smallest and locally exists is a nearly middle domain 6 of the main face of the base part 5. This method is described.

The inventors first applied a natural mode analysis by a finite element method to a vibrator 1 having the above-mentioned shape in order to examine whether or not there is a small domain where a detecting vibration is smallest and locallized in relation to a vibrator 1 having the above-mentioned shape. And the vibration amplitude at each domain of the tuning-fork vibrator in the X-Z plane (where a driving vibration is generated) or in the Y-Z plane (where a detecting vibration is generated by a Coriolis force), in case of assuming that the vibrator has been cut along the X-Z plane shown in FIG. 2, has been obtained as distribution of the ratio of the vibration amplitude at each domain to the vibration amplitude at the maximum vibration amplitude point. FIG. 4 shows a result in the X-Z plane where a driving vibration is generated, and FIG. 5 shows a result in the Y-Z plane where a detecting vibration is generated by a Coriolis force.

In the example shown in FIGS. 4 and 5, the respective domains different in color from one another show domains each of whose colors represents the ratio of the vibration amplitude at a domain to the vibration amplitude at the maximum vibration amplitude point. A small domain having the smallest vibration, whose amplitude is less than one thousandth of the amplitude at the maximum vibration amplitude point in a vibrator, is indicated by orange color. And in this example, FIG. 4 shows the ratios in comparison with the maximum vibration amplitude point in a driving vibration, and FIG. 5 shows the ratios in comparison with the maximum vibration amplitude point in the detecting vibration; and from the result of FIG. 5, it has been confirmed that there is a small domain having the smallest detecting vibration. And similarly to the example shown in FIG. 2, it has been found that supporting the vibrator on the obverse and reverse sides at the nearly middle domain 6 of the main face of the base part 5 results in not only supporting the vibrator at a small domain having the smallest detecting vibration as known from FIG. 5 but also supporting the vibrator at a small domain having the smallest driving vibration as known from FIG. 3; and therefore in this example, supporting the vibrator in this way results in supporting the tuning-fork vibrator 1 in the overlapped domain having the smallest detecting vibration and having the smallest driving vibration.

Taking the above-mentioned results into account, a result shown in Table 1 has been able to be obtained by measuring the Q value of a driving vibration in the X-Z plane, the Q value of a detecting vibration in the Y-Z plane, and the sensitivity in relation to the example explained as a former example in FIG. 2 where the bottom part is fixed, the example where one axis is fixed, and the example where the vibrator is fixed as shown in FIG. 2 as the invention. From the result shown in Table 1, it has been found that both of the Q value of a driving vibration in the X-Z plane and the Q value of a detecting vibration in the Y-Z plane are higher and the sensitivity also is higher in the examples of the invention in comparison with the former examples.

TABLE 1

| | Q of driving vibration | Q of detecting vibration | Sensitivity (at 1 degree/sec) |
|---|---|---|---|
| Bottom part fixed | 4000 | 3000 | 1.1 mV |
| One axis fixed | 7000 | 8000 | 3.4 mV |
| Figure 2 | 30000 | 30000 | 10.8 mV |

Although the above-mentioned example shows an example of using three vibration pieces 2 to 4 in a tuning-fork vibrator 1, it is a matter of course that the number of vibration pieces is not limited to three and the invention can be also applied to another number of vibration pieces such as four pieces, five pieces, or the like. Although the above-mentioned example shows an example of generating a driving vibration in the X-Z plane and a detecting vibration in the Y-Z plane in FIG. 2, it is a matter of course that the invention can be also applied to a structure in which the shape of a vibrator 1 is kept as it is and a relation between both vibrations is reverse, namely, a driving vibration is generated in the Y-Z plane and a detecting vibration is generated in the X-Z plane.

And the present invention can be preferably applied to a vibrator of a horizontal-arrangement type in the following shape. A vibrator of this type uses a fixing piece part whose both ends are fixed, the main arm is provided at one side of this fixing piece part, a resonant piece is provided at the other side, and the fixing piece part, the main arm and the resonant piece are formed so as to extend substantially in a specified plane. That is to say, an exciting means and a bending-vibration detecting means can be provided at opposing sides of a fixing piece part, whose both ends are fixed. Thus, since a bad influence caused by an electromechanical mixture or the like between the exciting means and the bending-vibration detecting means can be prevented, the detection accuracy is improved.

In FIG. 6, an exciting means and a detecting means are separated from each other by a fixing piece part 25.

Concretely, both ends of the fixing piece part 25 are fixed by fixing members 26. A main arm 23 is provided at one side of the fixing piece part 25. The main arm 23 is provided with a long and narrow base part 13, and the bending-vibration pieces 22A, 18A and 22B, 18B extending from an end part of the base part 13 perpendicularly to the longitudinal direction of the base part 13.

A resonant piece 24 is provided at the other side of the fixing piece part 25. The resonant piece 24 is provided with a rectangle-shaped supporting part 30 extending from and perpendicularly to the fixing piece part 25, and an exciting means 15 is provided in the supporting part 30. The main arm 23 and the resonant piece 24 are linearly symmetric with respect to the fixing part 25. 14A and 14B represent detecting means.

Figure 8:
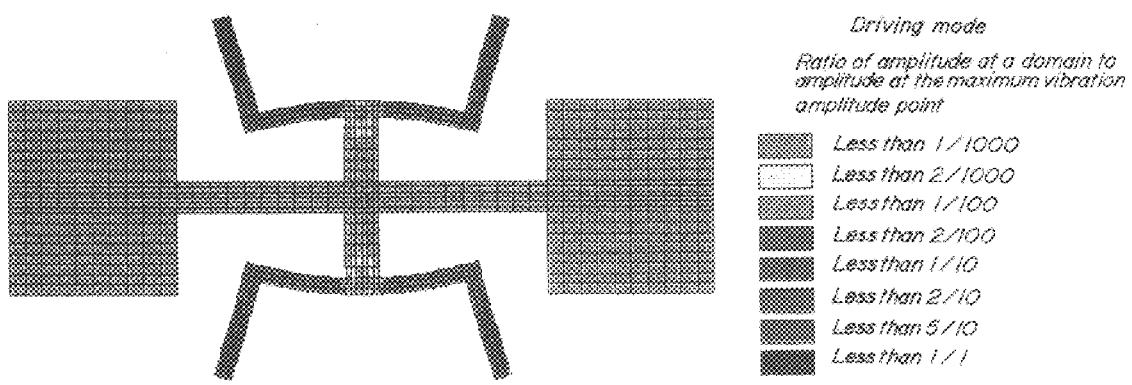
FIG. 8 is a figure showing another example of a result of applying a natural mode analysis by a finite element method to a driving vibration mode of a vibrator of FIG. 6.

FIGS. 7 and 8 show the result of applying a natural mode analysis by a finite element method to a vibrator having the opposing Y-shaped arms joined with the joint of two base parts as shown in FIG. 6. An example shown in FIG. 7 is a result in relation to a detection mode vibration, and an example shown in FIG. 8 is a result in relation to a driving mode vibration. From the example shown in FIG. 7, it has been confirmed that there is a small domain having the smallest detecting vibration at the respective middle points of both base parts and an intersecting point of the opposing Y-shaped arms and the joint of the two base parts. And from the example shown in FIG. 8, it has been confirmed that there is a small domain having the smallest driving vibration also in a driving mode vibration. In the example shown in FIG. 7, it has been found that supporting the vibrator at the respective middle points of both base parts and an intersecting point of the opposing Y-shaped arms and the joint of the two base parts results in also supporting the vibrator at the small domain having the smallest driving mode vibration as known from FIG. 8; and therefore in this example, the vibrator is supported in the overlapped domain having the smallest detecting vibration and the smallest driving vibration.

Actually in relation to the vibrators of FIGS. 7 and 8, when the Q value of a driving vibration, the Q value of a detecting vibration in the same plane as the driving vibration, and the sensitivity have been measured in relation to the example explained in FIG. 1 where the bottom part is fixed and the example where the vibrator is supported at each of the small domains having the smallest detecting vibration according to the invention, namely, at the respective middle points of both base parts or an intersecting point of the opposing Y-shaped arms and the joint of the two base parts; the results shown in Tables 2 and 3 have been able to be obtained. Hereupon, the result of Table 2 shows an example of supporting the vibrator at the intersecting point of the opposing Y-shaped arms and the joint of the two base parts, and the result of Table 3 shows an example of supporting the vibrator at the respective two middle points of both base parts. From the results shown in Tables 2 and 3, it has been found that the Q value of a driving vibration is made slightly higher and the Q value of a detecting vibration is made extraordinarily higher, and furthermore the sensitivity is made higher in any of the examples of the invention, in comparison with the former examples.

TABLE 2

|  | Q of driving mode vibration | Q of detecting mode vibration | Sensitivity (at 1 degree/sec) |
|---|---|---|---|
| Bottom part fixed | 4000 | 300 | 0.2 mV |
| Node fixed (invention) | 5000 | 3000 | 1.3 mV |

TABLE 3

|  | Q of driving mode vibration | Q of detecting mode vibration | Sensitivity (at 1 degree/sec) |
|---|---|---|---|
| Bottom part fixed | 4000 | 300 | 0.2 mV |
| Node fixed (invention) | 5000 | 4000 | 1.5 mV |

And when comparing Table 1 showing the result of a vibratory gyroscope of a vertical-arrangement type and Tables 2 and 3 each of which shows the result of a vibratory gyroscope of a horizontal-arrangement type with each other among the examples of the invention, it has been found that in any example of the invention the Q value of a detection mode vibration is made one digit or so higher and the invention is more effective to a vibratory gyroscope of a horizontal-arrangement type having usually a small Q value of the detection mode vibration.

And the present invention can be preferably applied to a vibratory gyroscope of a horizontal-arrangement type as described below. This vibrator is a vibrator for turning around a specified turning axis and is provided with at least a plurality of vibration systems, and is formed so that these vibration systems extend in a specified plane intersecting the turning axis and the vibration system is provided with a first vibration system containing a radial vibration component in which the center of gravity of vibration of the vibration system vibrates in the radial direction in a specified plane with respect to the center of gravity of the vibrator, and a second vibration system containing a circumferential vibration component in which the center of gravity of vibration of the vibration system vibrates in the circumferential direction in a specified plane with respect to the center of gravity of the vibrator.

A vibration component vibrating in the circumferential direction means a vibration component vibrating in the circumferential direction in a specified plane with respect to the center of gravity GO. A vibration component vibrating in the radial direction means a vibration component vibrating in the diametrical direction in a specified plane with respect to the center of gravity GO, namely, a component vibrating alternately in the directions of becoming more distant from and closer to the center of gravity GO.

The first and second vibration systems are connected with each other in some manner to form a vibrator extending in a specified plane. A turning angular rate can be detected by turning such a vibrator around the axis of turning Z as shown by an arrow w.

Figure 9:
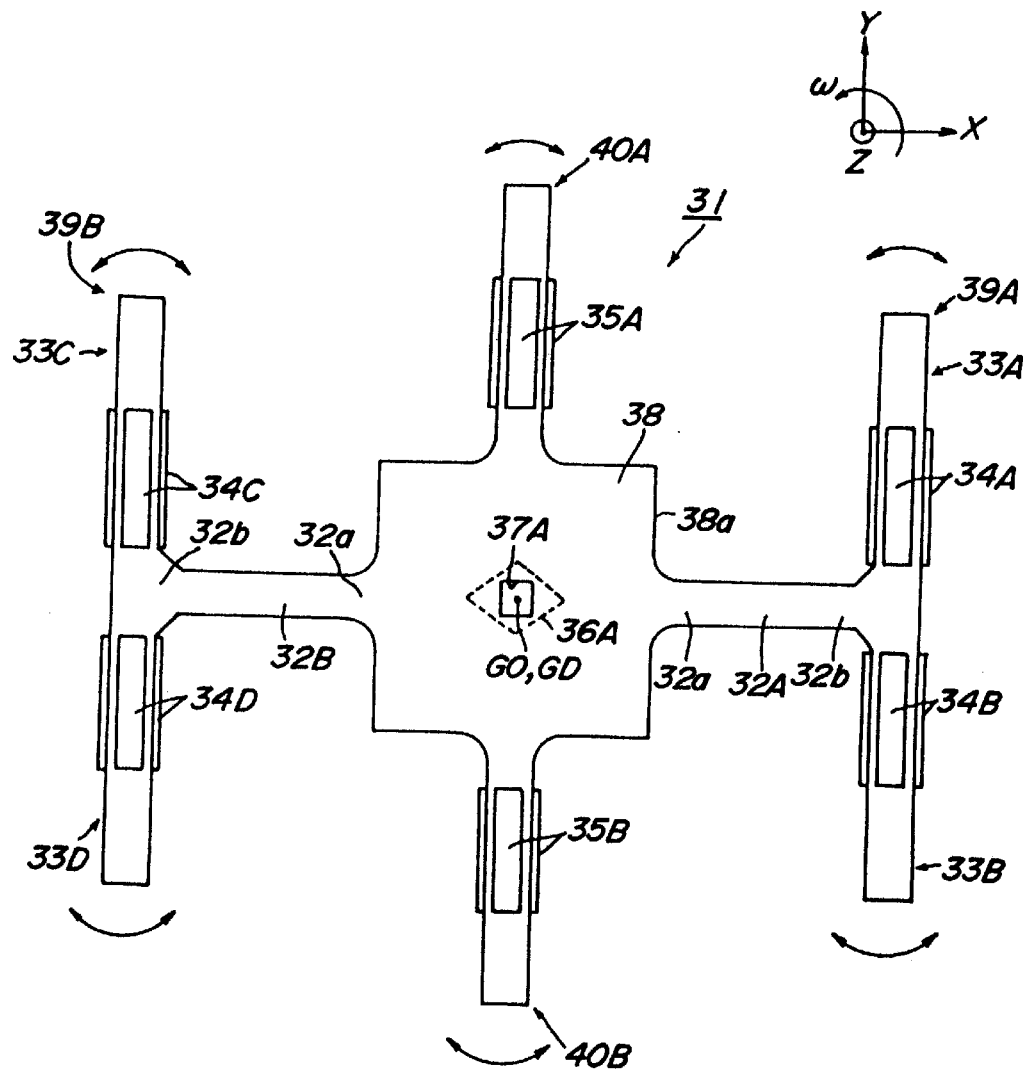
FIG. 9 is a rough front view for explaining operation of a vibrator 31 to which the present invention can be particularly preferably applied.

FIG. 9 is a plan view roughly showing a vibratory gyroscope provided with a vibrator 31 made of a piezoelectric single crystal according to this embodiment. A base part 38 is in the shape of a tetrad-symmetric square with the center of gravity GO of the vibrator as the center. Two driving vibration systems 39A, 39B (first vibration system in this example) and two detecting vibration systems 40A, 40B (the second vibration system in this example) project from the peripheral part 38a of the base part 38 radially in four directions, and the respective vibration systems are separated from one another. The driving vibration systems 39A and 39B are diad-symmetric with the center of gravity GO as the center, and the detecting vibration systems 40A and 40B are diad-symmetric with the center of gravity GO as the center.

The driving vibration systems 39A and 39B are provided with supporting parts 32A and 32B projecting from the peripheral part 38a of the base part 38 and bending-vibration pieces 33A, 33B, 33C and 33D extending from the top ends 32b of the supporting parts 32A and 32B perpendicularly to the supporting parts. The bending-vibration pieces 33A, 33B, 33C and 33D are respectively provided with driving electrodes 34A, 34B, 34C and 34D. The detecting vibration systems 40A and 40B are formed out of long and narrow circumferential bending-vibration pieces, and these bending-vibration pieces are respectively provided with detection electrodes 35A and 35B.

The inventors applied a natural mode analysis by a finite element method to the vibrator of FIG. 9 in order to examine an influence which the driving vibration mode and the detecting vibration mode have on the whole vibrator. And we made the vibrator of quartz and obtained the amplitude of vibration of each point of the vibrator as distribution of the ratio of the amplitude of vibration of each point to the maximum vibration amplitude point.

Figure 10:
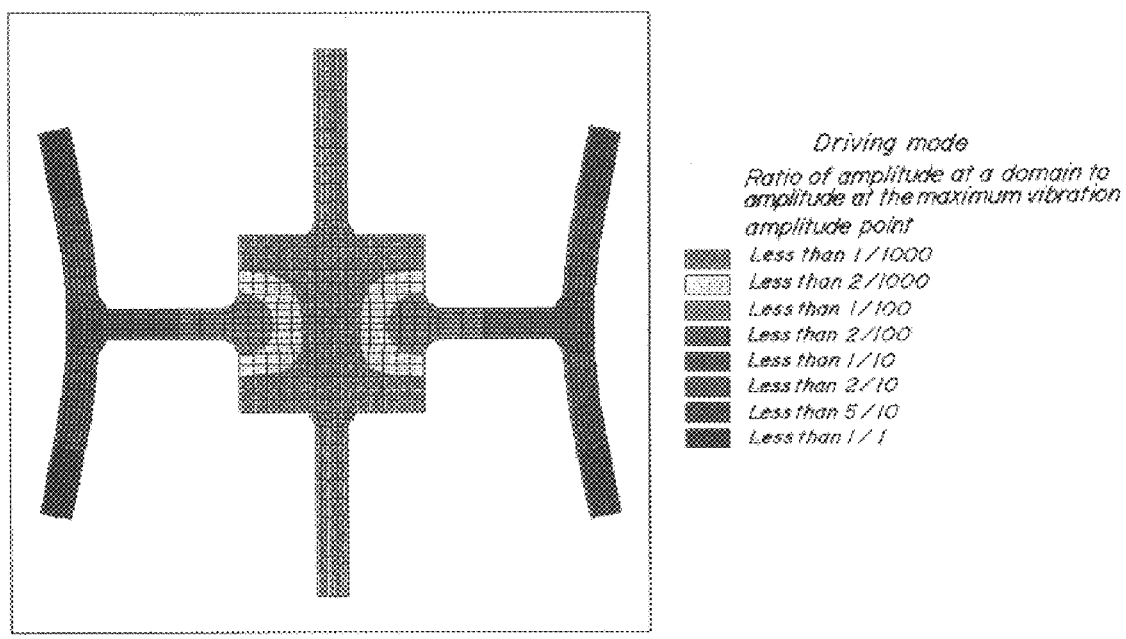
FIG. 10 is a figure showing an example of a result of applying a natural mode analysis by a finite element method to a driving vibration mode of a vibrator of FIG. 9.
Figure 11:
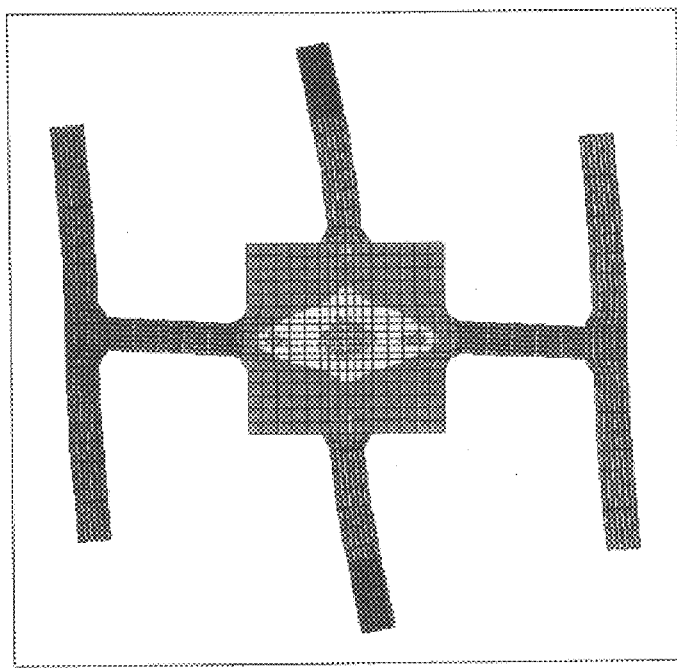
FIG. 11 is a figure showing an example of a result of applying a natural mode analysis by a finite element method to a detecting vibration mode of the vibrator of FIG. 9.

FIG. 10 shows a relative ratio of the amplitude of vibration at each point in the vibrator to the maximum vibration amplitude in a driving vibration mode, and FIG. 11 shows a relative ratio of the amplitude of vibration of each point in the vibrator to the maximum vibration amplitude in a detecting vibration mode. In a driving vibration mode of FIG. 10, the respective bending-vibration pieces bending-vibrate around the vicinities of the top ends 32b of the supporting parts 32A and 32B. In a detection mode of FIG. 11, the supporting parts 32A and 32B bending-vibrate circumferentially around the fixing parts 32a, and the bending-vibration pieces 40A and 40B of the detecting vibration system bending-vibrate correspondingly to this.

In FIGS. 10 and 11, the respective domains different in color from one another show domains each of whose colors represents the ratio of the vibration amplitude at a domain to the vibration amplitude at the maximum vibration amplitude point. Orange indicates a domain being smallest in amplitude.

According to FIG. 10, a tensile stress is applied in the vicinity of the fixing part 32a of each of the supporting parts 32A and 32B to the base part 38 with vibration of each driving vibration system, and transformation is seen. But since the driving vibration systems 39A and 39B are arranged at diad-symmetric positions, influences of this transformation cancel each other in the base part. Therefore, no influence by the driving vibration is seen near the center of the base part and in the detecting vibration systems 40A and 40B located between the driving vibration systems.

According to FIG. 11, influences exerted by the driving vibration systems 39A and 39B on the base part cancel each other. Furthermore, since the detecting vibration systems are located at diad-symmetric positions, influences exerted by the detecting vibration systems 40A and 40B on the base part cancel each other, also. As the result, no influence by the detecting vibration is seen in the vicinity of the center 36A of the base part (see FIGS. 9 and 11).

According to the present invention, the vibrator 31 is supported and fixed within a domain 36A where the detecting vibration is smallest in amplitude. Or a supporting hole 37A is formed there.

And in this example, as shown in FIGS. 9 to 11, the center of gravity GO of the vibrator is located within a domain where the driving vibration is smallest.

And in this example, the center of gravity GO of the vibrator is located within a domain where the detecting vibration is smallest, and the supporting hole 37A is provided in the overlapped domain and the vibrator is supported as described later using the supporting hole 37A.

Figure 12:
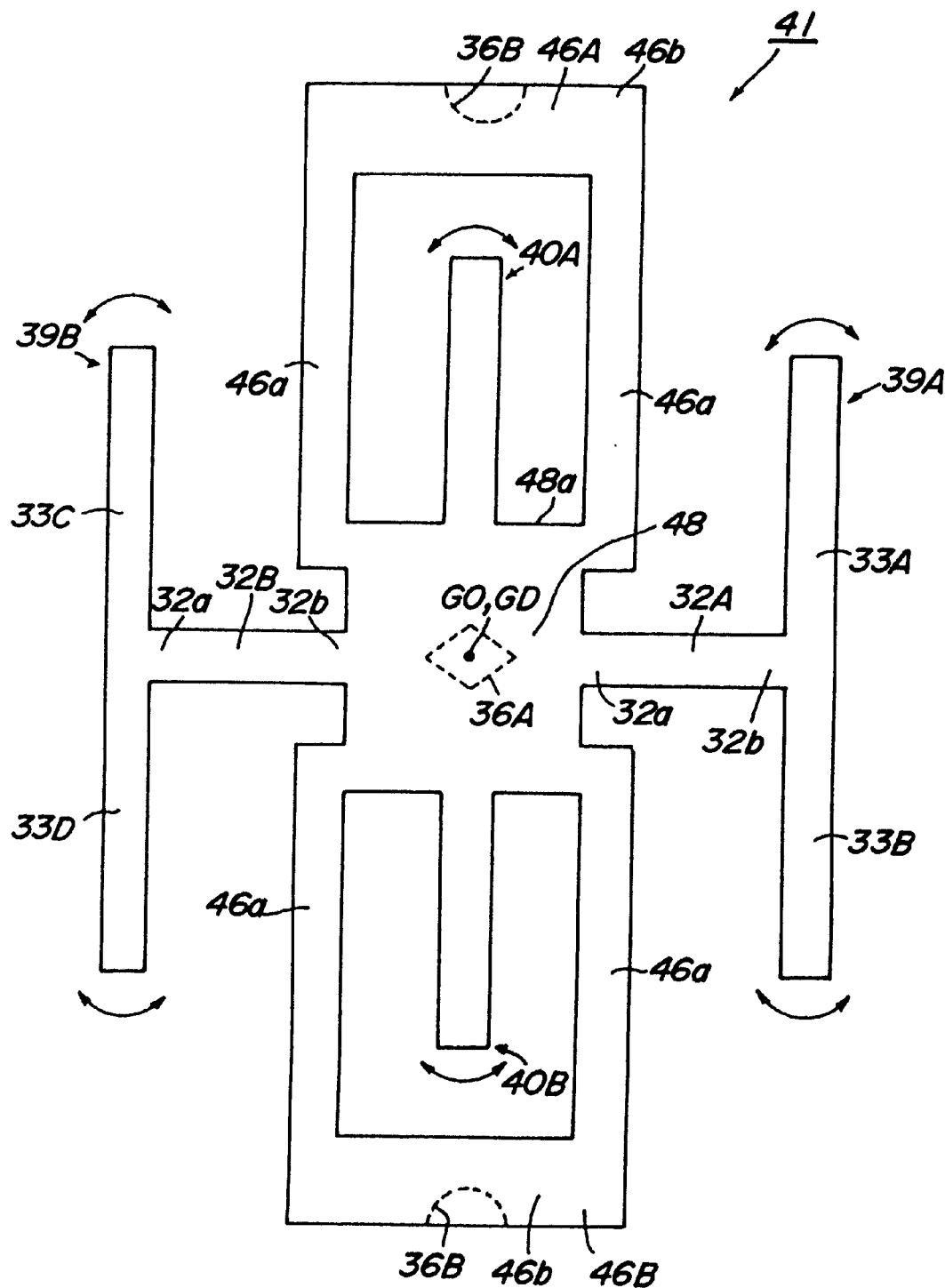
FIG. 12 is a rough front view for explaining operation of another vibrator 41 to which the present invention can be applied.

FIG. 12 is a plan view roughly showing a vibrator 41 according to another embodiment. Driving vibration systems 39A, 39B and detecting vibration systems 40A, 40B and operation of them are similar to those shown in FIG. 9. Frame parts 46A and 46B extend from two peripheral parts 48a at the detecting vibration system sides of the base part 48, and each detecting vibration system is surrounded by each frame part. Each frame part is provided with connecting parts 46a extending in parallel with each detecting vibration system and a supporting frame 46b for supporting and fixing the vibrator according to need. A domain having the smallest amplitude in a driving vibration and a detecting vibration in each of the frame parts 46A and 46B is supported and fixed.

Figure 13:
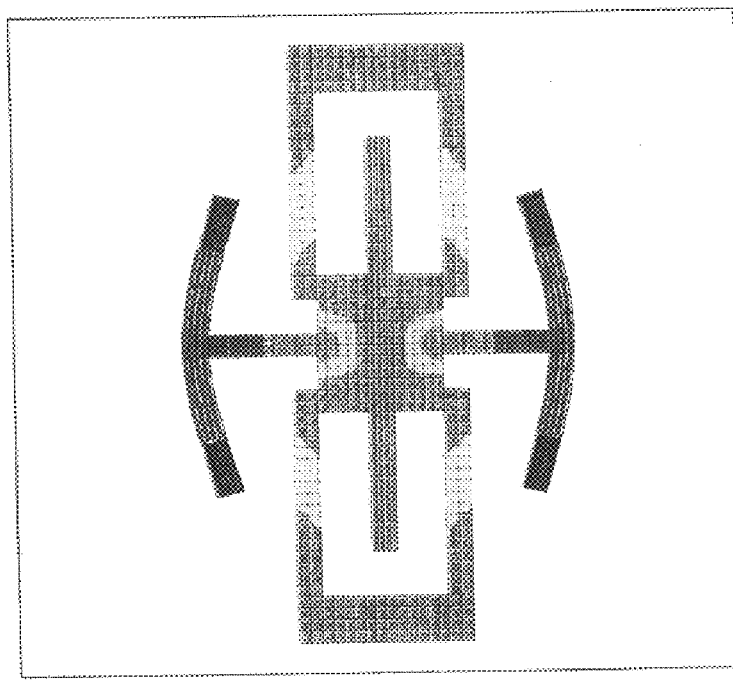
FIG. 13 is a figure showing an example of a result of applying a natural mode analysis by a finite element method to a driving vibration mode of the vibrator of the type of FIG. 12.

FIG. 13 shows a relative ratio of the amplitude of vibration of each point in the vibrator of FIG. 12 to the maximum vibration amplitude in a driving vibration mode, and FIG. 14 shows a relative ratio of the amplitude of vibration of each point in the vibrator to the maximum vibration amplitude in a detecting vibration mode.

According to FIG. 13, a tensile stress is applied in the vicinity of the fixing part 32a of each of the supporting parts 32A and 32B to the base part 48 with vibration of each driving vibration system, and transformation is seen. This influence is slightly seen in the connecting part 46a of the frame part. Since these influences cancel each other, however, no influence by the driving vibration is seen near the center of the base part and in each bending-vibration piece of the driving vibration systems and in each supporting frame 46b of the frame parts.

According to FIG. 14, influences exerted by the driving vibration systems and the detecting vibration systems on the base part 48 cancel each other, and as the result, no influence by the detecting vibration is seen in the vicinity 36A of the center of the base part 48. A supporting hole can be provided in 36A. In addition to this, however, since a domain 36B in the supporting frame 46b is also smallest in amplitude, this domain 36B also can be supported and fixed.

In this example, as shown in FIGS. 12 and 13, the center of gravity GO of the vibrator and the center of gravity GD of the whole driving vibration system are located within a domain having the smallest amplitude in a driving vibration. And as shown in FIGS. 12 and 14, the center of gravity GO of the vibrator and the center of gravity GD of the whole driving vibration system are located within a domain 36A having the smallest amplitude in a detecting vibration.

Next, a concrete supporting method is exemplified in case of providing a supporting hole in a vibrator. For example, as shown in FIGS. 15(a) and 15(b), in said vibrator 31, a supporting hole 47 is provided in a domain where the detecting vibration is smallest and the vibrator is supported with the supporting hole 47. A jig 43, which is a supporting means, is fixed on a supporting stand 42. The jig 43 is provided with a body 43a, a shoulder 43b and a projection 43c. The projection 43 is inserted into the supporting hole 47 to put the base part 38 on the shoulder 43b.

Results of experiment in case of using the vibrators 31 as shown in FIGS. 9 to 15 and adopting two kinds of supporting methods are described in the following.

First, a vibrator 31 in a shape as shown in FIG. 15 was made. In this case, a chromium film of 200 angstroms in thickness and a gold film of 5000 angstroms in thickness were formed at specified positions on a wafer of Z-plate of crystallized quartz of 0.3 mm in thickness by means of a sputtering method. Both faces of the wafer were coated with a resist and are provided with an external shape pattern of the vibrator by means of a photolithography method. At this time, a supporting hole pattern was not provided in a first embodiment, but was provided in a second embodiment.

This wafer was immersed in an aqueous solution of iodine and potassium iodide, an excessive part of the gold film was removed by etching, the wafer was further immersed in an aqueous solution of cerium-ammonium nitrate and perchloric acid, and an excessive part of the chromium film was etched off. The wafer was etched by immersing the wafer in ammonium bifluoride at a temperature of 80° C. for 20 hours to form the external shape of the vibrator. At this time, a supporting hole was not formed in the first embodiment, but was formed in the second embodiment. An aluminum film of 2000 angstroms in thickness was formed as an electrode film, using a metal mask.

Next, a driving vibration was generated by applying a voltage of 1.0 volt to an electrode of a vibrator having no supporting hole formed in it and distribution of the amplitude in each point on the vibrator was measured. The result is shown in Table 4.

TABLE 4

| Distance from a geometric center of the vibrator (mm) | Driving electrode (ralative value) |
| --- | --- |
| 0.3 | 1 |
| 0.5 | 351370 |
| 1.0 | 708300 |
| 1.5 | 1453500 |
| 2.0 | 2302200 |
| 2.5 | 3277600 |
| 3.0 | 4693400 |
| 3.9 | 6061600 |
| 4.7 | 9829900 |
| 5.6 | 13470000 |
| 6.4 | 17304000 |
| 7.3 | 19615000 |
| 7.5 | 19851000 |
| 7.8 | 20617000 |
| 8.0 | 21169000 |
| 8.3 | 22703000 |

In this way, although the amplitude is remarkably small near the center of gravity GO of the vibrator, the amplitude is increased, for example, at a position 1.0 mm distant from the center of gravity. Due to this, there has been a possibility that the degree of influence exerted by a supporting means on the vibrator changes when the supporting position is slipped by a mechanical cause or a vibrating state is slightly changed due to a temperature change.

On the other hand, a vibrating state of a vibrator having a supporting hole formed in it was examined in the same way as described. Here, the supporting hole was formed into the shape of a circle of 0.3 mm in diameter. Distribution of the amplitude in each point on the vibrator was measured. The result is shown in Table 5.

TABLE 5

| Distance from a geometric center of the vibrator (mm) | Driving electrode (ralative value) |
| --- | --- |
| 0.3 | 1200000 |
| 0.5 | 1197500 |
| 1.0 | 1213900 |
| 1.5 | 1728000 |
| 2.0 | 2519000 |
| 2.5 | 3467500 |
| 3.0 | 4869500 |
| 3.9 | 6228800 |
| 4.7 | 9994600 |
| 5.6 | 13639000 |
| 6.4 | 17473000 |
| 7.3 | 19784000 |
| 7.5 | 20021000 |
| 7.8 | 20787000 |
| 8.0 | 21339000 |
| 8.3 | 22872000 |

In this way, it is known that variation in amplitude is remarkably small, for example, within a range of 1.5 mm distant from the center of gravity.

Figure 16:
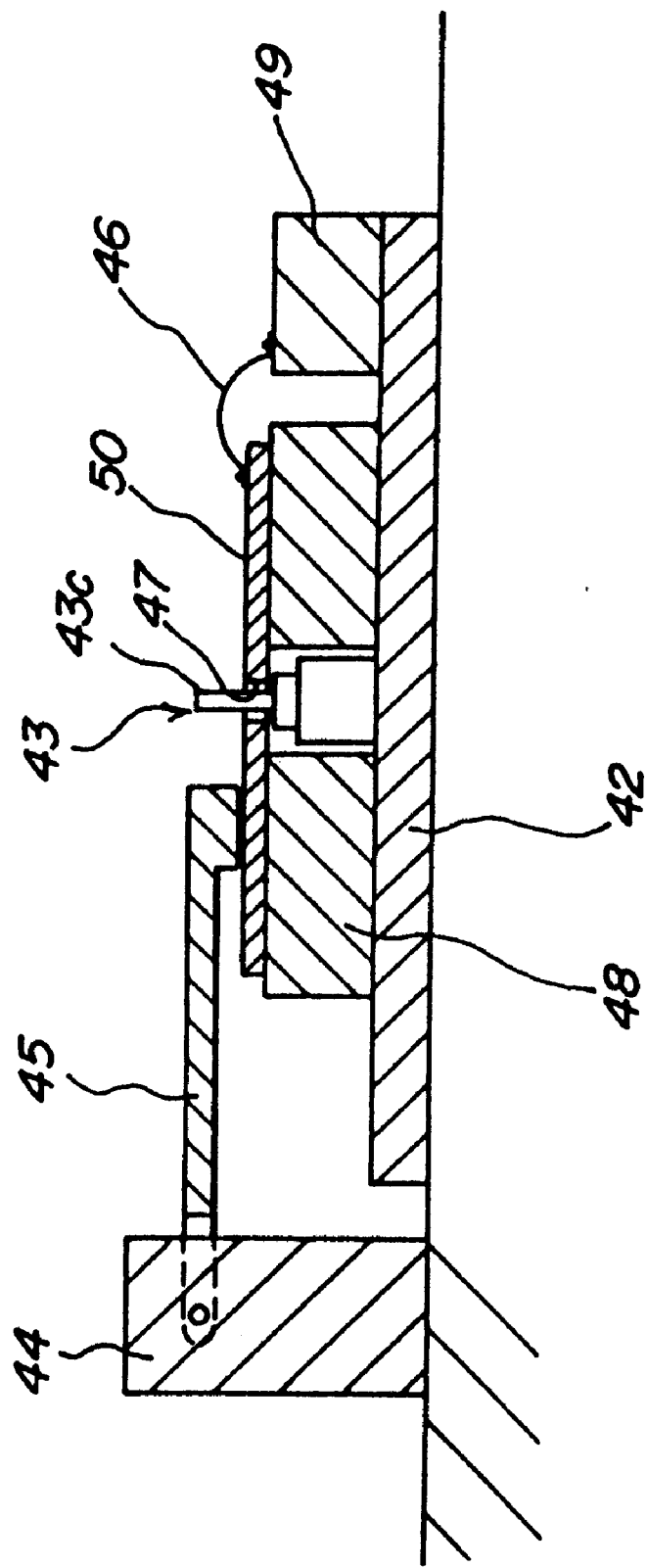
FIG. 16 is a sectional view roughly showing an example of a supporting and fixing device of a vibrator.

A vibrator is fixed as shown in FIGS. 16 and 17, for example. A spacer 48, a control part 49 and a supporting jig 43 are put on a supporting stand 42. A vibrator 50 is put on the spacer 48 and a projection 43c of the jig 43 is inserted into a supporting hole 47 of the vibrator 50. A gap between the inner wall face of the supporting hole 47 and the projection 43c is filled with resin, solder, metalization or the like. Specified wires 46 are connected onto the control part 49, and the wires 46 are connected to a specified electrode pattern on the vibrator 50. And a fixing jig 45 projects from a fixing stand 44, and the vibrator 50 is mechanically fixed at a specified position on the spacer by the fixing jig 45.

In FIG. 18(*a*), projections 51A and 51B are arranged on the upside and downside of the vibrator 50 so as to put the supporting hole 47 between them, and the vibrator 50 is pressure-joined with the projections 51A and 51B in the vertical direction. In FIGS. 18(*b*) and 18(*c*), a pin 52a is provided on a projection 52 and a hole 53a is provided in another projection 53. The projections 52 and 53 are arranged above and below the vibrator 50 so as to put the supporting hole 47 between them, and the pin 52a is inserted into and through the supporting hole 47 and further inserted into the hole 53a and then the vibrator 50 is pressure-joined with the projections 52 and 53 in the vertical direction.

In FIG. 19(*a*), a projection 51 of a supporting means is arranged below the supporting hole 47 and the surface of the vibrator and the projection 51 are joined through a joining layer 54 with each other. In FIG. 19(*b*), projections 51A and 51B are arranged above and below the vibrator so as to put the supporting hole 47 of the vibrator between them, and a joining material 54 is filled into the supporting hole 47 and between the vibrator 50 and projections 51A and 51B to form a joining layer. And as shown in FIG. 19(*c*), a projection 52a of the supporting means 52 is inserted into and through the supporting hole 47a and a joining layer 54 is formed between an end face of the supporting means 52 and the vibrator 50 and between the projection 52a and the inner wall face of the supporting hole 47. And in FIG. 19(*d*), similarly to FIG. 18(*b*), a pin 52a is provided on a projection 52, a hole 53a is provided in another projection 53, the projections 52 and 53 are arranged above and below the vibrator 50 so as to put the supporting hole 47 between them, the pin 52a is inserted into and through the supporting hole 47, and further inserted into the hole 53a. And a joining material 54 is filled between the vibrator 50 and each end face of the supporting means 52 and 53 and between the projection 52a and the inner wall face of the supporting hole 47.

FIGS. 20 to 26 are examples where a plurality of holes are formed in a base part of a vibrator and one or plural holes out of the plurality of holes are used as supporting holes.

In a vibrator 61A of FIG. 20, eight holes 62A, 62B and 62C are provided so as to surround the centers of gravity GO and GD in a base part 60A. Among them, four holes 62A are provided at four corners of the base part 60A being in the shape of a quadrangle, and two holes 62B are between detecting vibration systems 40A, 40B and the centers of gravity GO, GD. Two holes 62C are between driving vibration systems 39A, 39B and the centers of gravity GO, GD. Preferably, the holes 62B are used as supporting holes as shown in this example. For example, as shown in FIG. 20(b), a supporting means 80 is provided. The supporting means 80 is provided with a supporting pole 81, an arm 82 projecting horizontally from the supporting pole 81, and two supporting projections 83. And the vibrator 61A is held by inserting the supporting projections respectively into the supporting holes 62B.

Figure 22:
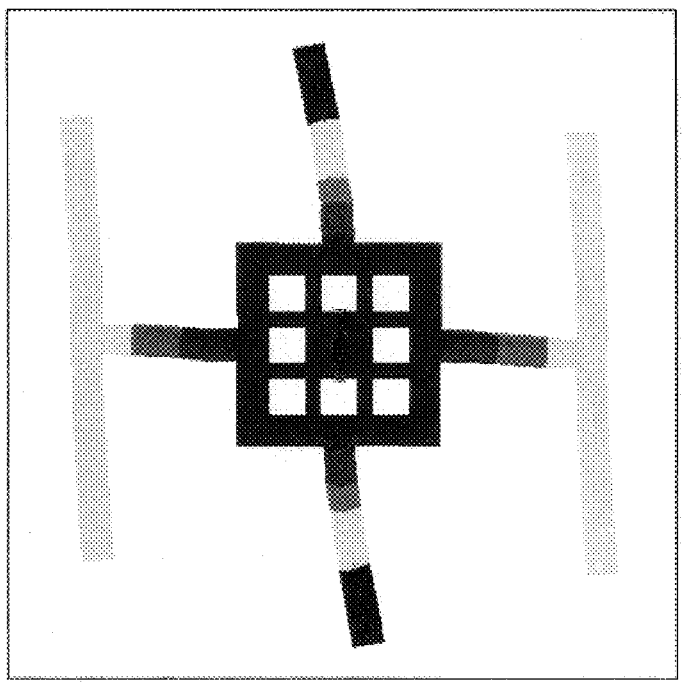
FIG. 22 is a figure showing an example of a result of applying a natural mode analysis by a finite element method to a detecting vibration mode of the vibrator of FIG. 20.

FIG. 21 shows a relative ratio of the amplitude of vibration of each point in the vibrator 61A to the maximum vibration amplitude in a driving vibration mode, and FIG. 22 shows a relative ratio of the amplitude of vibration of each point in the vibrator to the maximum vibration amplitude in a detecting vibration mode. In FIGS. 21 and 22, the respective domains different in color from one another show domains each of whose colors represents the ratios. The domains being smallest in amplitude are indicated by orange.

The driving vibration systems and the detecting vibration systems are the same in operation as described above. However, the amplitude of each point in the base part 60A is greatly different in comparison with a case where there is no hole. That is to say, for example in FIG. 11, a domain where the detecting vibration is smallest in the base part 60A was nearly in the shape of a rhombus. In this example, however, since the holes 62B are provided in particular between the detecting vibration systems and the center of gravity, as shown in FIGS. 20 and 22, a domain 36C where the detecting vibration is smallest extends long and narrowly between the two detecting vibration systems 40A and 40B, and this domain 36C reaches the inner wall faces of the respective supporting holes 62B to be exposed. As the result, as shown in FIGS. 20(a) and 20(b), the domain where the detecting vibration is smallest comes to be directly supported by the projections 83.

As known from FIG. 21, a domain nearly in the shape of an octagon where the driving vibration is smallest is generated in the central part of each hole, and these domains surround said domain 36C. Therefore, the domain 36C is the overlapped domain.

Figure 23:
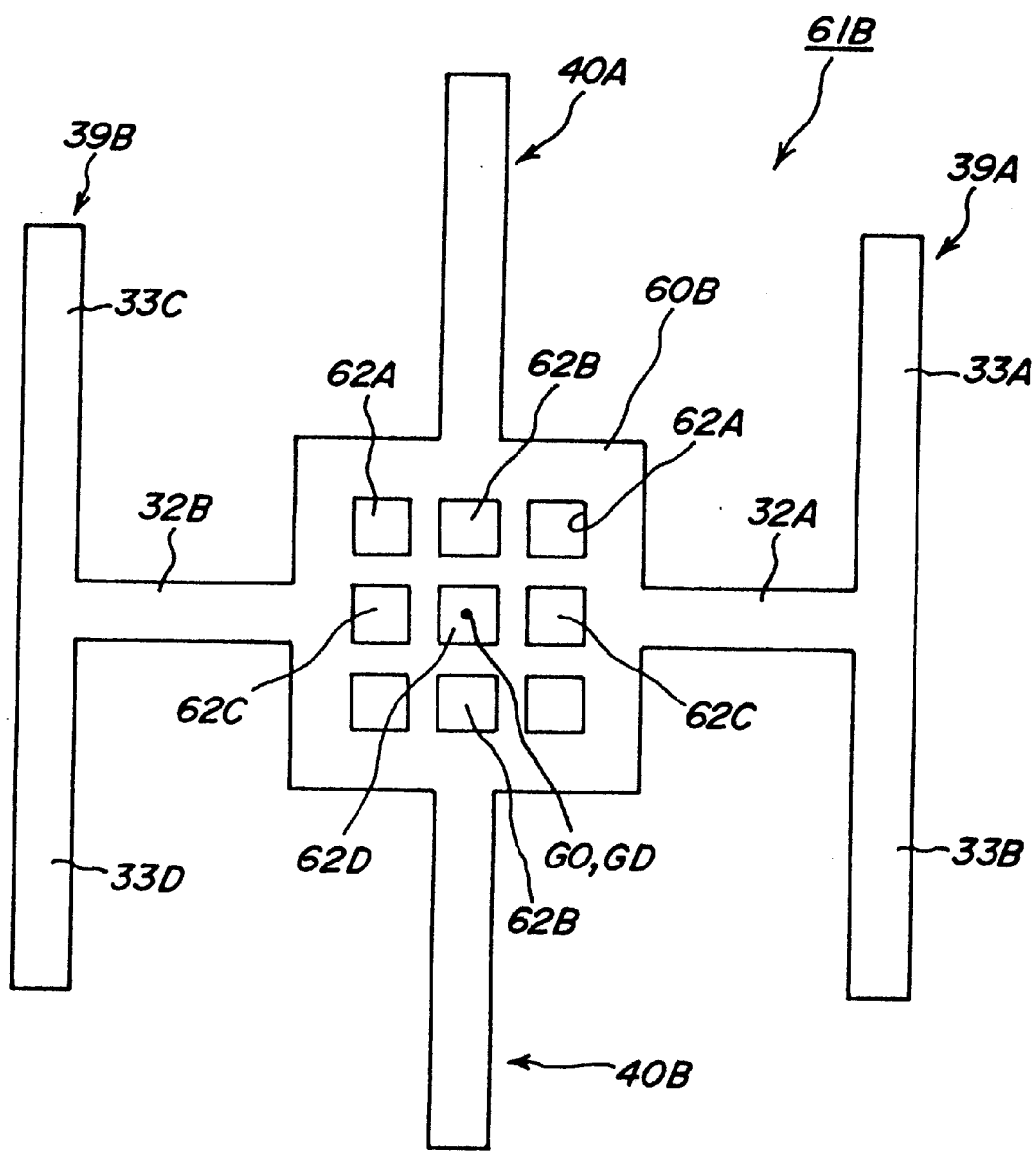
FIG. 23 is a front view showing a vibrator 61B having nine holes provided in its base part 60B.

In a vibrator 61B of FIG. 23, furthermore, a central hole 62D is formed in a base part 60B. In this case, it is preferable to support the hole 62D and/or the hole 62B.

Figure 24:
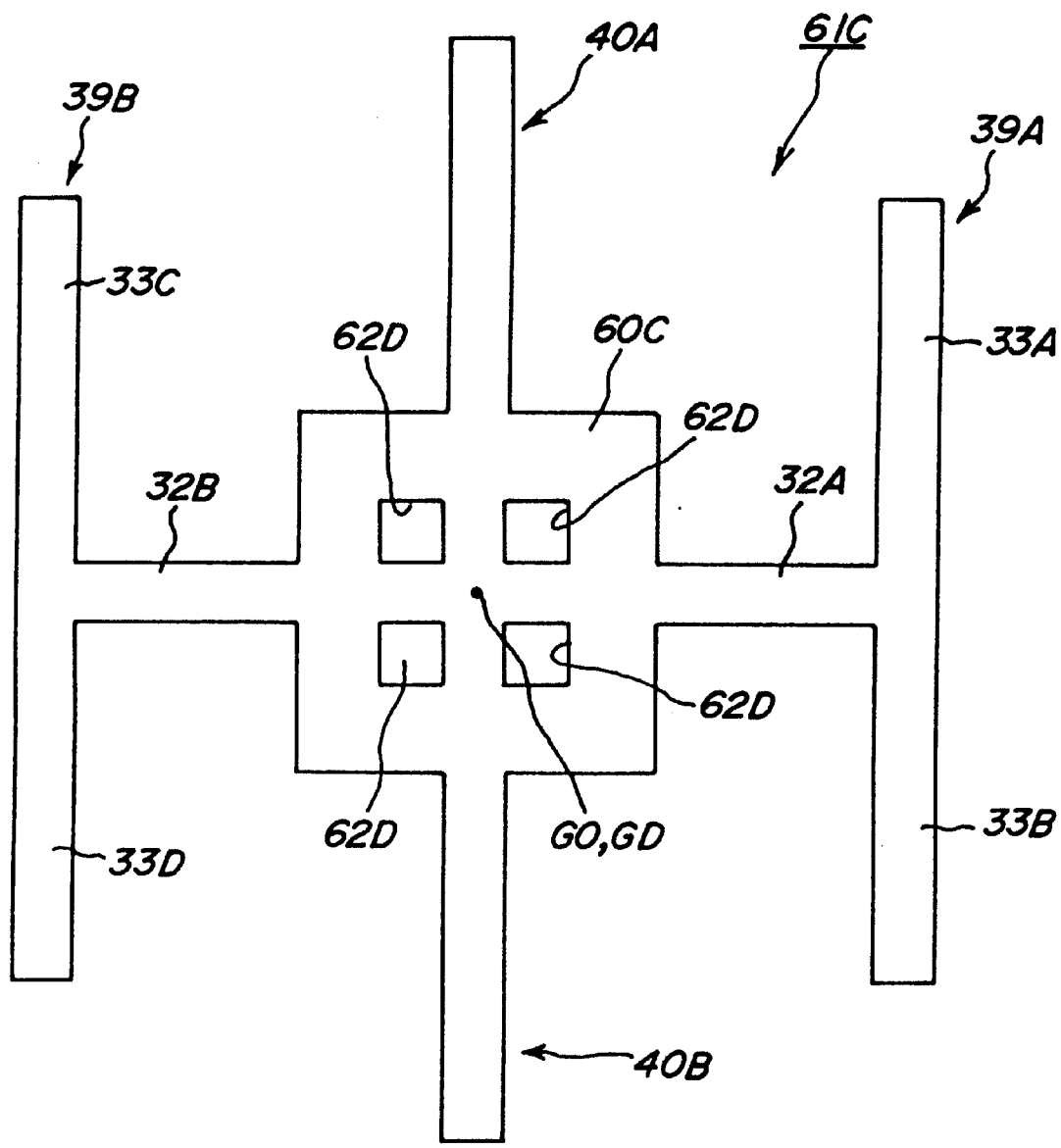
FIG. 24 is a front view showing a vibrator 61C having four holes provided in its base part 60C.

In a vibrator 61C of FIG. 24, four holes 62D are formed in a base part 60C. The respective holes 62D are formed so as to be tetrad-symmetric with respect to the center of gravity to surround the centers of gravity GO and GD. It is preferable to support two or more holes out of these holes.

Figure 25:
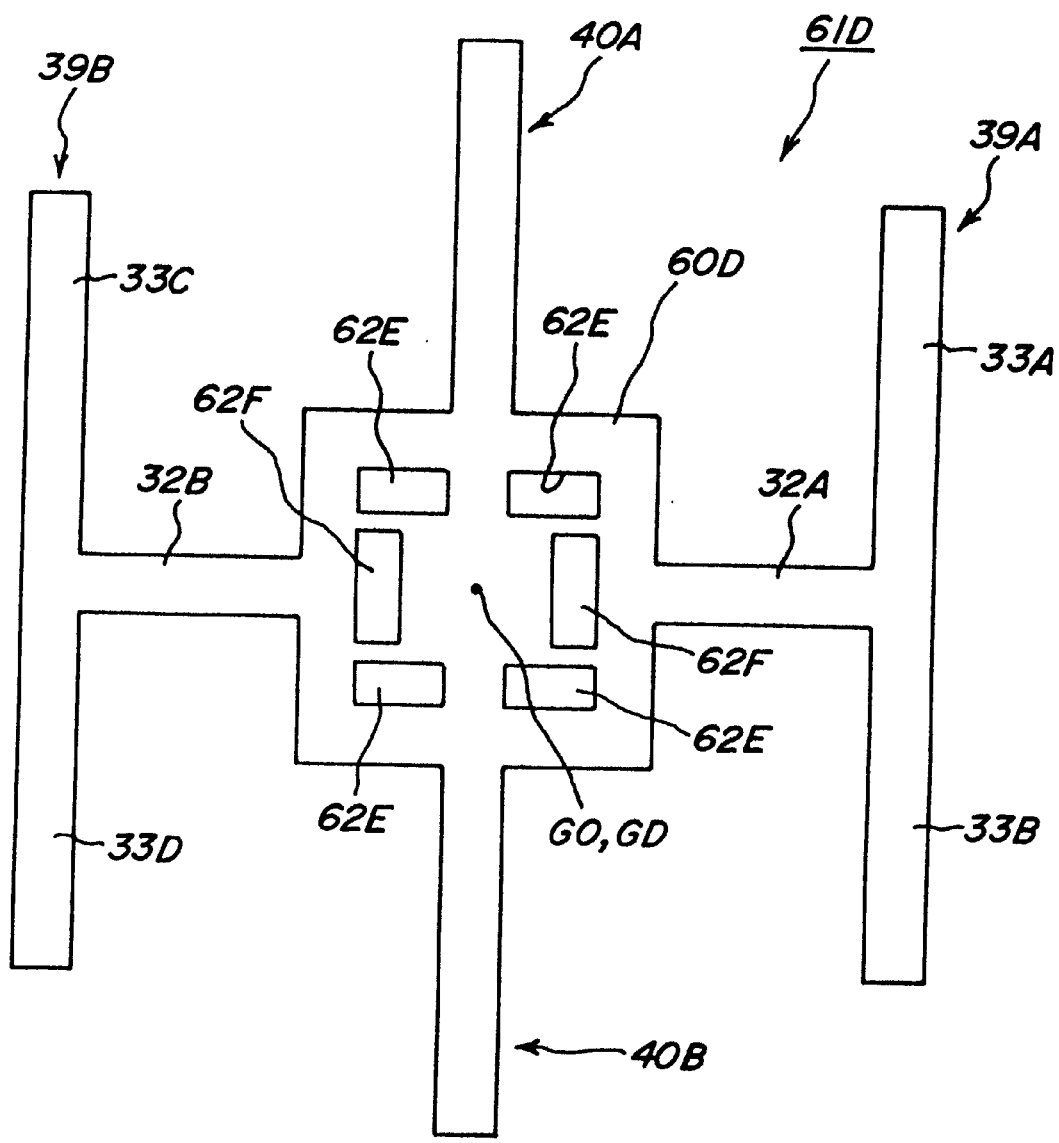
FIG. 25 is a front view showing a vibrator 61D having six holes provided in its base part 60D.

In a vibrator 61D of FIG. 25, six holes 62E and 62F are formed in a base part 60D. The holes 62E are between the center of gravity GO and the detecting vibration systems 40A, 40B. The two holes 62F are between the center of gravity GO and the driving vibration systems 39A, 39B. In this case, the vibrator can be supported with the four holes 62E, or can be supported with the two holes 62F. Due to providing a plurality of holes in the base part 62D, the respective amplitudes of the driving vibration and detecting vibration in the base part are changed and a domain where the detecting vibration is smallest and a domain where the driving vibration is smallest are wider in comparison with a case where the base part has no hole. Therefore, it is possible to support the vibrator at a domain where both domains overlap each other.

In a vibrator 61E of FIG. 26, four holes 62D are provided in a base part 60E. The holes 62D are formed so as to be tetrad-symmetric with respect to the center of gravity to surround the centers of gravity GO and GD. And long and narrow holes 62G are formed respectively outside the holes 62D. In this example, it is preferable to support two or four holes 62D and/or to support domains which are inner than the respective holes 62D and where the detecting vibration is smallest.

What is claimed is:

1. A vibratory gyroscope for detecting a turning angular rate of rotation, comprising:
   a vibrator having a plurality of vibration pieces connected to a base part, said base part having an upper surface and a lower surface, with a recess formed in said lower surface within a domain where detecting vibration in said vibrator is smallest and in a vicinity of the center of gravity of said vibrator; and
   a supporting member for supporting said vibrator in the region of said recess;
   wherein said gyroscope detects the turning angular rate based on a detecting vibration excited in said vibrator as a result of the turning angular rate when a driving vibration is applied to at least one of said vibration pieces.

2. The vibratory gyroscope of claim 1, wherein said recess extends through the entire thickness of said base part.

3. The vibratory gyroscope of claim 1, wherein said vibration pieces and said base part comprise a piezoelectric single crystal.

4. The vibratory gyroscope of claim 1, further comprising a plurality of through holes extending through said base part at positions that are centrosymmetric with respect to the center of gravity of said vibrator.

5. The vibratory gyroscope of claim 1, wherein said supporting member supports said vibrator within said recess.

6. A vibrator comprising:
   a base part having an upper surface and a lower surface;
   a plurality of vibration pieces connected to said base part;
   a recess formed in said lower surface of said base part within a domain where a detecting vibration in said vibrator is smallest and in a vicinity of the center of gravity of said vibrator; and
   a supporting member for supporting said vibrator in the region of said recess.

7. The vibrator of claim 6, wherein said recess extends through the entire thickness of said base part.

8. The vibrator of claim 6, wherein said vibration pieces and said base part comprise a piezoelectric single crystal.

9. The vibrator of claim 6, further comprising a plurality of through holes extending through said base part at positions that are centrosymmetric with respect to the center of gravity of said vibrator.

10. The vibrator of claim 6, wherein said supporting member supports said vibrator within said recess.

11. A method for supporting a vibrator that includes a plurality of vibration pieces connected to a base part, comprising the steps of:
   applying a driving vibration to at least one of the vibration pieces to allow a detecting vibration to occur in the vibrator;
   computing amplitude ratios of the detecting vibration along each point of the vibrator to a maximum amplitude of the detecting vibration in the vibrator, by means of a natural mode analysis by a finite element method;
   using the computed ratios to detect a domain within the vibrator where the detecting vibration is smallest; and
   supporting the vibrator within the domain and in the vicinity of the center of gravity of the vibrator.

12. The method of claim 11, wherein said driving vibration is predetermined and said method further comprises:
   computing the ratio of the amplitude of a driving vibration along each point of the vibrator to the maximum amplitude of the driving vibration in the vibrator, by means of a natural mode analysis by a finite element method; and
   using the computed ratios to detect a domain within the vibrator where the driving vibration is smallest.

13. A method for supporting a vibrator that includes a plurality of vibration pieces connected to a base part, comprising the steps of:
   applying a driving vibration to at least one of the vibration pieces to allow a detecting vibration to occur in the vibrator;
   computing amplitude ratios of the detecting vibration along each point of the vibrator to a maximum amplitude of the detecting vibration in the vibrator, by means of a natural mode analysis by a finite element method;
   using the computed ratios to detect a domain within the vibrator where the detecting vibration is smallest; and
   positioning a supporting recess within the domain and in the vicinity of the center of gravity of the vibrator.

14. A method for manufacturing a vibratory gyroscope, comprising:
   providing a vibrator that includes a plurality of vibration pieces connected to a base part;
   applying a driving vibration to at least one of the vibration pieces to allow a detecting vibration to occur in the vibrator;
   computing amplitude ratios of the detecting vibration along each point of the vibrator to a maximum amplitude of the detecting vibration in the vibrator, by means of a natural mode analysis by a finite element method;
   using the computed ratios to detect a domain within the vibrator where the detecting vibration is smallest; and
   supporting the vibrator within the domain and in the vicinity of the center of gravity of the vibrator;
   wherein the gyroscope detects the turning angular rate based on a detecting vibration excited in the vibrator as a result of the turning angular rate when a driving vibration is applied to at least one of the vibration pieces.

15. A method for manufacturing a vibratory gyroscope, comprising:
   providing a vibrator that includes a plurality of vibration pieces connected to a base part;
   applying a driving vibration to at least one of the vibration pieces to allow a detecting vibration to occur in the vibrator;
   computing amplitude ratios of the detecting vibration along each point of the vibrator to a maximum amplitude of the detecting vibration in the vibrator, by means of a natural mode analysis by a finite element method;
   using the computed ratios to detect a domain within the vibrator where the detecting vibration is smallest;
   forming supporting recesses in said vibrator around the domain; and
   supporting the vibrator in the vicinities of at least two of the supporting recesses and in the vicinity of the center of gravity of the vibrator;
   wherein the gyroscope detects the turning angular rate based on a detecting vibration excited in the vibrator as a result of the turning angular rate when a driving vibration is applied to at least one of the vibration pieces.

16. The method of claim 15, wherein the vibrator is supported within said supporting recesses.

* * * * *